United States Patent
Hoshina et al.

(10) Patent No.: US 10,957,900 B2
(45) Date of Patent: Mar. 23, 2021

(54) ACTIVE MATERIAL, NONAQUEOUS ELECTROLYTE BATTERY, BATTERY PACK AND VEHICLE

(71) Applicant: Kabushiki Kaisha Toshiba, Minato-ku (JP)

(72) Inventors: Keigo Hoshina, Kashiwazaki (JP); Yasuhiro Harada, Isehara (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 67 days.

(21) Appl. No.: 15/260,974

(22) Filed: Sep. 9, 2016

(65) Prior Publication Data

US 2017/0077499 A1 Mar. 16, 2017

(30) Foreign Application Priority Data

Sep. 16, 2015 (JP) .............................. JP2015-182772

(51) Int. Cl.
*H01M 4/36* (2006.01)
*H01M 2/10* (2006.01)
(Continued)

(52) U.S. Cl.
CPC .......... *H01M 4/364* (2013.01); *C01G 33/006* (2013.01); *C01G 35/006* (2013.01);
(Continued)

(58) Field of Classification Search
None
See application file for complete search history.

(56) References Cited

U.S. PATENT DOCUMENTS

2004/0258997 A1* 12/2004 Utsugi ................. H01M 4/131
429/232
2011/0073804 A1 3/2011 Sotokawa et al.
(Continued)

FOREIGN PATENT DOCUMENTS

CN 101154729 A 4/2008
CN 103066265 A * 4/2013
(Continued)

OTHER PUBLICATIONS

Izumi Nakai, et al., "Funmatsu X sen Kaisetsu no Jissai (Reality of Powder X-Ray Analysis)", X-Ray Analysis Investigation Conversazione, The Japan Society for Analytical Chemistry, Asakura Publishing Co., Ltd., 2002, pp. 97-115.

*Primary Examiner* — Zhongqing Wei

(74) *Attorney, Agent, or Firm* — Oblon, McClelland, Maier & Neustadt, L.L.P.

(57) ABSTRACT

According to one embodiment, there is provided an active material. The active material includes secondary particles. The secondary particles include first primary particles and second primary particles. The first primary particles include an orthorhombic Na-containing niobium-titanium composite oxide. The second primary particles include at least one selected from the group consisting of a carbon black, a graphite, a titanium nitride, a titanium carbide, a lithium titanate having a spinel structure, a titanium dioxide having an anatase structure, and a titanium dioxide having a rutile structure.

20 Claims, 5 Drawing Sheets

(51) Int. Cl.
*H01M 2/34* (2006.01)
*H01M 4/505* (2010.01)
*H01M 4/131* (2010.01)
*H01M 4/485* (2010.01)
*H01M 4/525* (2010.01)
*H01M 10/0525* (2010.01)
*H01M 2/30* (2006.01)
*C01G 33/00* (2006.01)
*C01G 35/00* (2006.01)
*C01G 51/00* (2006.01)
*C01G 49/00* (2006.01)
*C01G 39/00* (2006.01)
*C01G 45/12* (2006.01)

(52) U.S. Cl.
CPC ....... *C01G 39/006* (2013.01); *C01G 45/1221* (2013.01); *C01G 49/009* (2013.01); *C01G 51/42* (2013.01); *H01M 4/131* (2013.01); *H01M 4/485* (2013.01); *C01P 2002/76* (2013.01); *C01P 2004/61* (2013.01); *H01M 10/0525* (2013.01); *H01M 2220/20* (2013.01); *Y02E 60/10* (2013.01)

(56) References Cited

U.S. PATENT DOCUMENTS

| | | | |
|---|---|---|---|
| 2012/0153225 A1 | 6/2012 | Ko et al. | |
| 2012/0261622 A1 | 10/2012 | Honma | |
| 2013/0209863 A1* | 8/2013 | Harada | H01M 4/483 |
| | | | 429/163 |
| 2014/0017567 A1 | 1/2014 | Oh et al. | |
| 2014/0295231 A1 | 10/2014 | Ise et al. | |

FOREIGN PATENT DOCUMENTS

| | | | |
|---|---|---|---|
| CN | 103247794 | | 8/2013 |
| JP | 2005-135872 | A | 5/2005 |
| JP | 2005267940 | A * | 9/2005 |
| JP | 2013-177310 | A | 9/2013 |
| JP | 2014-103032 | A | 6/2014 |
| JP | 2014-524653 | A | 9/2014 |
| JP | 2014-209445 | A | 11/2014 |
| WO | WO 2009/028530 | A1 | 3/2009 |
| WO | WO 2011/078112 | A1 | 6/2011 |

* cited by examiner

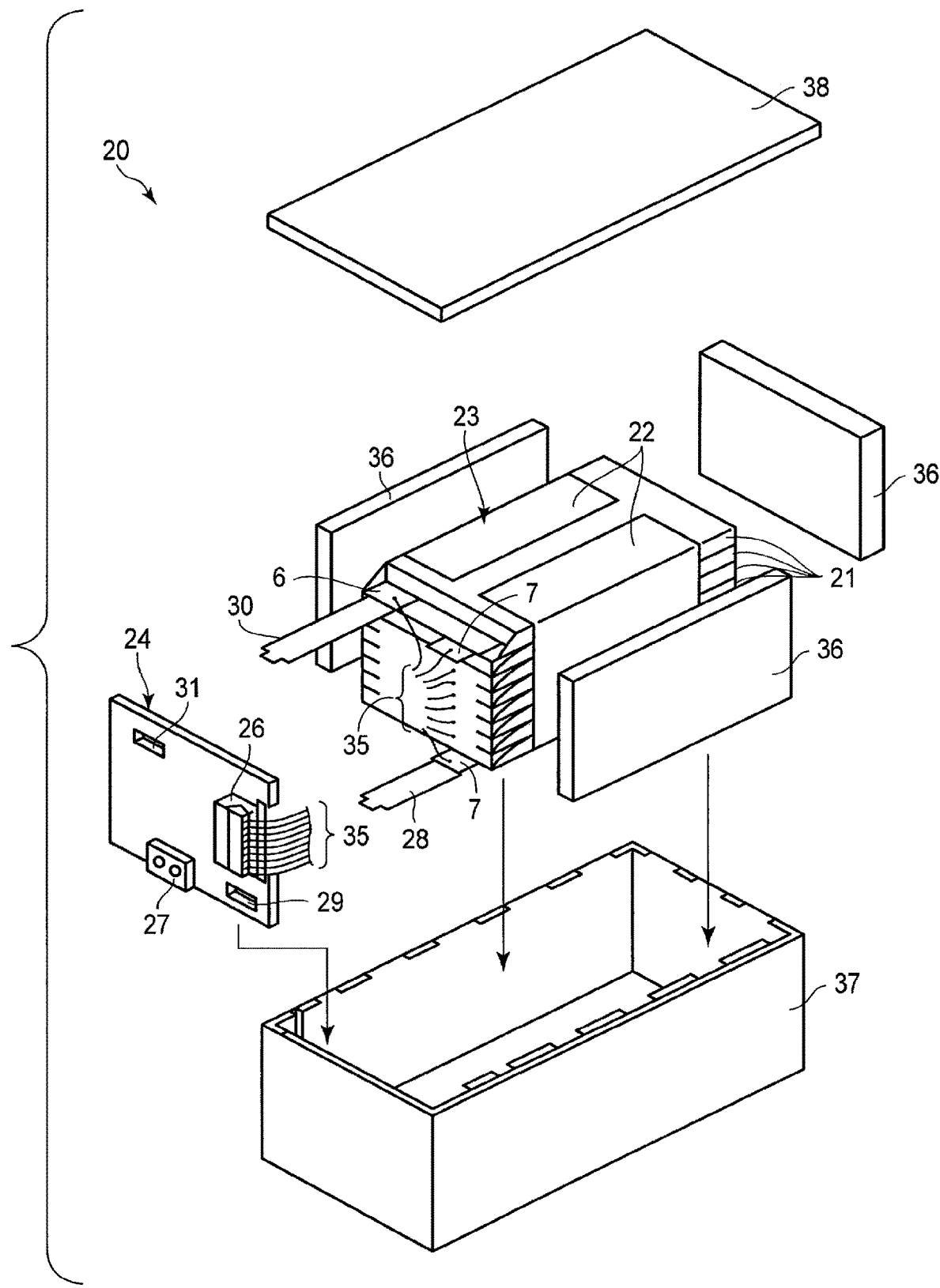
F I G. 7

ACTIVE MATERIAL, NONAQUEOUS
ELECTROLYTE BATTERY, BATTERY PACK
AND VEHICLE

CROSS-REFERENCE TO RELATED
APPLICATIONS

This application is based upon and claims the benefit of priority from the Japanese Patent Application No. 2015-182772, filed Sep. 16, 2015, the entire contents of which are incorporated herein by reference.

FIELD

Embodiments described herein relate generally to an active material for a battery, a nonaqueous electrolyte battery, a battery pack and a vehicle.

BACKGROUND

A nonaqueous electrolyte battery in which charge and discharge are performed by migration of lithium ions between a negative electrode and a positive electrode is actively researched as a high energy-density battery.

In addition to the use as a power supply for small electronic devices, the nonaqueous electrolyte battery is expected to be used as a medium to large power supply such as in-vehicle use or stationary use. For such a medium to large-scale use, the nonaqueous electrolyte battery is required to exhibit a life performance and a high-level safety. Further, the nonaqueous electrolyte battery is desired to exhibit high input-and-output performances.

As an example of the nonaqueous electrolyte battery exhibit a life performance and high-level safety, a nonaqueous electrolyte battery using titanium composite oxide for the negative electrode can be cited. However, the titanium composite oxide itself has low electronic conductivity and thus, to obtain high input-and-output racteristics, coating the titanium composite oxide with carbon or using a nonaqueous electrolyte having high conductivity of lithium ions can be considered.

BRIEF DESCRIPTION OF THE DRAWINGS

FIG. 7 is a schematic exploded perspective view of an example of a battery pack according to a third embodiment.

DETAILED DESCRIPTION

Figure 1:
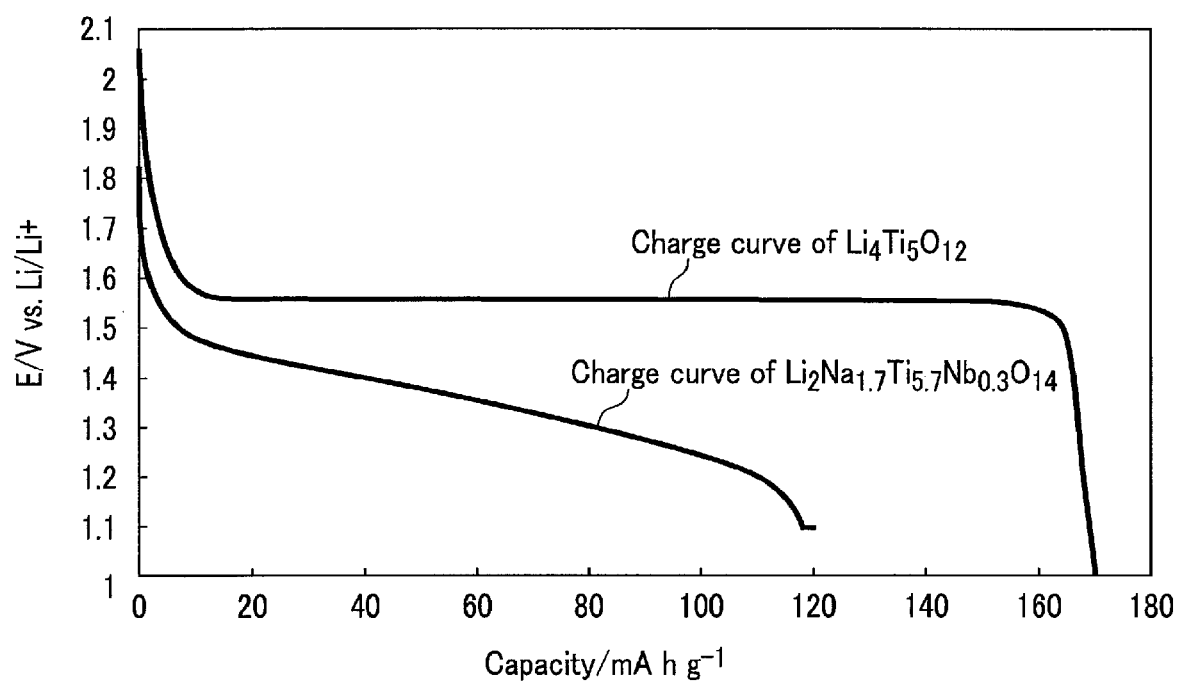
FIG. 1 shows charge curves of $Li_2Na_{1.7}Ti_{5.7}Nb_{0.3}O_{14}$ and $Li_4Ti_5O_{12}$.

In general, according to one embodiment, there is provided an active material. The active material includes secondary particles. The secondary particles include first primary particles and second primary particles. The first primary particles include an orthorhombic Na-containing niobium-titanium composite oxide. The second primary particles include at least one selected from the group consisting of a carbon black, a graphite, a titanium nitride, a titanium carbide, a lithium titanate having a spinel structure, a titanium dioxide having an anatase structure, and a titanium dioxide having a rutile structure.

According to the embodiment, there is provided a nonaqueous electrolyte battery. The nonaqueous electrolyte battery includes a positive electrode, a negative electrode, and nonaqueous electrolyte. The negative electrode includes the active material according to the embodiment.

According to the embodiment, there is provided a battery pack. The battery pack includes the nonaqueous electrolyte battery according to the embodiment.

According to the embodiment, there is provided a vehicle. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, there is provided an active material for a battery. The active material for a battery includes secondary particles. The secondary particles include first primary particles and second primary particles. The first primary particles include an orthorhombic Na-containing niobium-titanium composite oxide. The second primary particles include at least one selected from the group consisting of a carbon black, a graphite, a titanium nitride, a titanium carbide, a lithium titanate having a spinel structure, a titanium dioxide having an anatase structure, and a titanium dioxide having a rutile structure.

An orthorhombic Na-containing niobium-titanium composite oxide included in first primary particles may have an average operating potential of 1.2 to 1.4 V (vs. Li/Li$^+$). This operating potential is, among operating potentials of titanium composite oxides, a low value. Thus, an active material for a battery according to the first embodiment including the orthorhombic Na-containing niobium-titanium composite oxide can realize a nonaqueous electrolyte battery capable of exhibiting a high battery voltage.

Also, the orthorhombic Na-containing niobium-titanium composite oxide included in the first primary particles can exhibit a charge-and-discharge curve in which the potential change accompanying the change of a state-of-charge is large in the operating potential range. Thus, it is easy to grasp the state-of-charge of the orthorhombic Na-containing niobium-titanium composite oxide based on the potential thereof.

However, intensive research showed that electronic conductivity of the orthorhombic Na-containing niobium-titanium composite oxide is low. Then, it is found that a nonaqueous electrolyte battery using, as the negative electrode active material, secondary particles obtained by granulating primary particles of the orthorhombic Na-containing niobium-titanium composite oxide exhibits poor input-and-output performances.

The inventors conducted intensive research to enhance conductivity of secondary particles including primary particles of the orthorhombic Na-containing niobium-titanium composite oxide. As a result, the inventors found that, according to the first embodiment, a conductivity of secondary particles including primary particles of the orthorhombic Na-containing niobium-titanium composite oxide can be enhanced and then, a nonaqueous electrolyte battery excellent in input-and-output performances can be realized.

More specifically, second primary particles included in an active material for a battery according to the first embodiment can exhibit excellent conductivity. The active material for a battery according to the first embodiment can exhibit excellent conductivity by including, in addition to first primary particles of the orthorhombic Na-containing niobium-titanium composite oxide, such second primary particles. As a result, the active material for a battery according to the first embodiment can provide a nonaqueous electrolyte battery capable of exhibiting excellent input-and-output performance.

On the other hand, as another exemplary measures of enhancing conductivity of secondary particles including primary particles of the orthorhombic Na-containing niobium-titanium composite oxide, coating the secondary particles with a carbon material or the like can be considered. However, it is difficult for such measures to coat up to the inside of secondary particles with carbon. Therefore, an active material for a battery according to the first embodiment can exhibit conductivity superior to that of secondary particles obtained by such measures.

Next, an active material for a battery according to the first embodiment will be described in more detail.

The orthorhombic Na-containing niobium-titanium composite oxide included in a first primary particle can be represented by, for example, a general formula of $Li_{2+v}Na_{2-w}M1_xTi_{6-y-z}Nb_yM2_zO_{14+\delta}$.

In the general formula of $Li_{2+v}Na_{2-w}M1_xTi_{6-y-z}Nb_yM2_zO_{14+\delta}$, the subscript v can have a value within a range of $0 \leq v \leq 4$, depending on the charged-and-discharged state (the state-of-charge) of the orthorhombic Na-containing niobium-titanium composite oxide.

In the general formula, the subscript w corresponds to the amount of Na included in the orthorhombic Na-containing niobium-titanium composite oxide. The lithium insertion-and-extraction potential of the orthorhombic Na-containing niobium-titanium composite oxide can be adjusted by, for example, the amount of Na in the composite oxide. The subscript w can have a value within a range of, for example, $0<w<2$. The subscript w preferably has a value within a range from 0.1 to 1.

In the general formula, the subscript x corresponds to the amount of the metallic element M1 included in the orthorhombic Na-containing niobium-titanium composite oxide. The metallic element M1 may be at least one metallic element selected from the group consisting of Cs, K, Sr, Ba, and Ca. The metallic element M1 can be one metallic element selected from the group consisting of Cs, K, Sr, Ba and Ca. Alternatively, the metallic element M1 can include two or more metallic elements selected from the group consisting of Cs, K, Sr, Ba and Ca. The subscript x can has a value within a range of, for example, $0 \leq x<2$. Thus, the orthorhombic Na-containing niobium-titanium composite oxide may not include the metallic element M1. The subscript x preferably has a value within a range from 0.05 to 0.2.

In an aspect, the metallic element M1 includes Cs. When Cs is included, a more excellent cycle performance can be achieved. In another aspect, the metallic element M1 includes K. When K is included, a more excellent cycle performance can be achieved. In another aspect, the metallic element M1 includes Sr. When Sr is included, a more excellent rate performance can be achieved. In another aspect, the metallic element M1 includes Ba. When Ba is included, a more excellent rate performance can be achieved. In another aspect, the metallic element M1 includes Ca. When Ca is included, a more excellent rate performance can be achieved. The metallic element M1 preferably includes at least one of Sr and Ba.

In the general formula, the subscript y corresponds to the amount of niobium included in the orthorhombic Na-containing niobium-titanium composite oxide. The subscript y can have a value within a range of, for example, $0<y\leq 6$. The subscript y preferably has a value within the range from 0.1 to 1.

In the general formula, the subscript z corresponds to the amount of the metallic element M2 included in the orthorhombic Na-containing niobium-titanium composite oxide. The metallic element M2 may be at least one metallic element selected from the group consisting of Zr, Sn, V, Ta, Mo, W, Fe, Co, Mn, and Al. The metallic element M2 may be at least one metallic element selected from the group consisting of Zr, Sn, V, Ta, Mo, W, Fe, Co, Mn and Al. The metallic element M2 can be one metallic element selected from the group consisting of Zr, Sn, V, Ta, Mo, W, Fe, Co, Mn and Al. Alternatively, the metallic element M2 can include two or more metallic elements selected from the group consisting of Zr, Sn, V, Ta, Mo, W, Fe, Co, Mn and Al. The subscript z can have a value within the range of, for example, $0 \leq z<3$. Thus, the orthorhombic Na-containing niobium-titanium composite oxide may not include the metallic element M2. The subscript z preferably has a value within a range from 0.1 to 0.3.

In an aspect, the metallic element M2 includes Zr. When Zr is included, a more excellent cycle performance can be achieved. In another aspect, the metallic element M2 includes Sn. When Sn is included, a more excellent rate performance can be achieved. In another aspect, the metallic element M2 includes V. V can exhibit the same physical and chemical properties as those of Nb. In another aspect, the metallic element M2 includes Ta. Ta can exhibit the same physical and chemical properties as those of Nb. In another aspect, the metallic element M2 includes Mo. When Mo is included, a more excellent rate performance can be achieved. In another aspect, the metallic element M2 includes W. When W is included, a more excellent rate performance can be achieved. In another aspect, the metallic element M2 includes Fe. When Fe is included, a more excellent cycle performance can be achieved. In another aspect, the metallic element M2 includes Co. When Co is included, a more excellent cycle performance can be achieved. In another aspect, the metallic element M2 includes Mn. When Mn is included, a more excellent cycle performance can be achieved. In another aspect, the metallic element M2 includes Al. When Al is included, a more excellent rate performance can be achieved. The metallic element M2 preferably includes at least one selected from the group consisting of Al, Zr, Sn and V.

The subscript δ may correspond to a deviation of the amount of oxygen from the orthorhombic Na-containing niobium-titanium composite oxide that can be represented by the general formula of $Li_{2+v}Na_{2-w}M1_xTi_{6-y-z}Nb_yM2_zO_{14}$. A negative value of the subscript δ may mean that oxygen is less than the stoichiometric ratio. On the other hand, a positive value of the subscript δ may mean that oxygen is more than the stoichiometric ratio. It is difficult for composite oxide for which the value of the subscript δ exceeds the range of $-0.5 \leq \delta \leq 0.5$ to establish a balance between the rate and cycle characteristics. The subscript δ preferably has a value within a range of $-0.1 \leq \delta \leq 0.1$.

The first primary particles may include one orthorhombic Na-containing niobium-titanium composite oxide or two or more orthorhombic Na-containing niobium-titanium composite oxides.

First primary particles preferably have an average particle size $D_A$ within a range of 500 nm to 5 μm. If the average particle size $D_A$ of first primary particles is within the range of 500 nm to 5 μm, the first primary particles can have a sufficient specific surface area so that a side reaction with an electrolytic solution can be prevented. Also, if the average particle size $D_A$ of first primary particles is within the range of 500 nm to 5 μm, first primary particles can have a sufficient specific surface area so as to obtain sufficient input-and-output performances. The average particle size $D_A$ of the first primary particles is preferably within a range of 500 nm to 2 μm.

Second primary particles include at least one selected from the group consisting of a carbon black, a graphite, a titanium nitride (TiN), a titanium carbide (TiC), a lithium titanate having a spinel structure, a titanium dioxide ($TiO_2$) having an anatase structure, and a titanium dioxide ($TiO_2$) having a rutile structure. For example, the second primary particles can include one selected from the group consisting of a carbon black, a graphite, a titanium nitride (TiN), a titanium carbide (TiC), a lithium titanate having a spinel structure, a titanium dioxide ($TiO_2$) having an anatase structure, and a titanium dioxide ($TiO_2$) having a rutile structure. Alternatively, the second primary particles include two or more members selected from the group consisting of a carbon black, a graphite, a titanium nitride (TiN), a titanium carbide (TiC), a lithium titanate having a spinel structure, a titanium dioxide ($TiO_2$) having an anatase structure, and a titanium dioxide ($TiO_2$) having a rutile structure. Furthermore, the second primary particles can, for example, include one member selected from the group consisting of carbon black particles, graphite particles, titanium nitride (TiN) particles, titanium carbide (TiC) particles, spinel-type lithium titanate particles, anatase-type titanium dioxide ($TiO_2$) particles, and rutile-type titanium dioxide ($TiO_2$) particles. Alternatively, the second primary particles can, for example, include two or more members selected from the group consisting of carbon black particles, graphite particles, titanium nitride (TiN) particles, titanium carbide (TiC) particles, spinel-type lithium titanate particles, anatase-type titanium dioxide ($TiO_2$) particles, and rutile-type titanium dioxide ($TiO_2$) particles.

Preferably, the second primary particles include at least one selected from the group consisting of the lithium titanate having the spinel structure, the $TiO_2$ having the anatase structure, and the $TiO_2$ having rutile structure. Each of the lithium titanate having the spinel structure, $TiO_2$ having the anatase structure, and $TiO_2$ having the rutile structure is a material which can be in a state where titanium in the crystal structure is reduced when lithium is inserted, and which, in the state, can exhibit an improved electronic conductivity.

Spinel-type lithium titanate, that is, lithium titanate having a spinel-type crystal structure can be represented by, for example, the general formula of $Li_{4+x}Ti_5O_{12}$ (the subscript x can has a value within a range of $0 \leq x \leq 3$ in accordance with the charged/discharged state). Spinel-type lithium titanate represented by the general formula of $Li_{4+x}Ti_5O_{12}$ can exhibit, for example, a lithium insertion-and-extraction potential of about 1.55 V with respect to lithium metal. Both $TiO_2$ having an anatase structure (anatase-type $TiO_2$) and $TiO_2$ having a rutile structure (rutile-type $TiO_2$) can exhibit a lithium insertion-and-extraction potential of about 1.8 V with respect to lithium metal.

As described previously, the orthorhombic Na-containing niobium-titanium composite oxide included in the first primary particles may have a lithium insertion potential of 1.2 to 1.4 V (vs. $Li/Li^+$). Therefore, each of the spinel-type lithium titanate, the anatase-type $TiO_2$, and the rutile-type $TiO_2$ that can be included in the second primary particles has a lithium insertion potential higher than that of the orthorhombic Na-containing niobium-titanium composite oxide included in the first primary particles.

As an example, lithium insertion curves, that is, charge curves of $Li_2Na_{1.7}Ti_{5.7}Nb_{0.3}O_{14}$ as an example of the orthorhombic Na-containing niobium-titanium composite oxide and $Li_4Ti_5O_{12}$ as an example of lithium titanate having the spinel structure are shown in FIG. 1.

As shown in FIG. 1, the lithium insertion potential of $Li_4Ti_5O_{12}$ is higher than that of $Li_2Na_{1.7}Ti_{5.7}Nb_{0.3}O_{14}$. Thus, for example, when a nonaqueous electrolyte battery including secondary particles including primary particles of the orthorhombic Na-containing niobium-titanium composite oxide $Li_2Na_{1.7}Ti_{5.7}Nb_{0.3}O_{14}$ and primary particles of the spinel-type lithium titanate $Li_4Ti_5O_{12}$ in the negative electrode is charged, the spinel-type lithium titanate $Li_4Ti_5O_{12}$ can exhibit a higher lithium-insertion potential and thus, Li can be inserted into the spinel-type lithium titanate prior to insertion of Li into the orthorhombic Na-containing niobium-titanium composite oxide. Therefore, insertion of Li into the orthorhombic Na-containing niobium-titanium composite oxide included in the first primary particles can occur in a state in which Li has been inserted into the spinel-type lithium titanate included in the second primary particles, that is, in a state in which the spinel-type lithium titanate can exhibit an excellent conductivity. The second primary particles including spinel-type lithium titanate in this state can facilitate insertion of Li into the orthorhombic Na-containing niobium-titanium composite oxide.

Furthermore, as is evident from FIG. 1, primary particles of the orthorhombic Na-containing niobium-titanium composite oxide $Li_2Na_{1.7}Ti_{5.7}Nb_{0.3}O_{14}$ can make a potential change caused by insertion of Li larger than that caused by the spinel-type lithium titanate. Thus, a nonaqueous electrolyte battery including the secondary particles including the primary particles of the orthorhombic Na-containing niobium-titanium composite oxide and the primary particles of the spinel-type lithium titanate in the negative electrode thereof can detect the voltage based on voltage changes more easily than a battery including secondary particles including the primary particles of spinel-type lithium titanate only in the negative electrode thereof.

When discharged, on the other hand, the orthorhombic Na-containing niobium-titanium composite oxide can exhibit a lower lithium-extraction potential and thus, Li can be extracted from the orthorhombic Na-containing niobium-titanium composite oxide prior to extraction of Li from the spinel-type lithium titanate $Li_4Ti_5O_{12}$. Thus, extraction of Li from the spinel-type lithium titanate can be suppressed until orthorhombic Na-containing niobium-titanium composite oxide becomes in a completely discharged state. In the meantime, the second primary particles including the spinel-type lithium titanate can maintain excellent conductivity and so can facilitate extraction of Li from orthorhombic Na-containing niobium-titanium composite oxide.

For similar reasons, the anatase-type $TiO_2$ and the rutile-type $TiO_2$ can facilitate insertion of Li into the orthorhombic Na-containing niobium-titanium composite oxide included in first primary particles and extraction of Li from the orthorhombic Na-containing niobium-titanium composite oxide.

Further, the spinel-type lithium titanate, the anatase-type $TiO_2$, and the rutile-type $TiO_2$ can exhibit electrical insulating properties in a state of having no Li inserted thereinto. For example, when a short-circuit occurs, the spinel-type lithium titanate, the anatase-type $TiO_2$, and the rutile-type $TiO_2$ can become an electric insulator due to rapidly extraction of Li. Thus, when at least one of the spinel-type lithium titanate, the anatase-type $TiO_2$, and the rutile-type $TiO_2$ is included in the second primary particles, the second primary particles can suppress a discharge during the short-circuit and so can exhibit an excellent safety.

The second primary particles preferably have an average particle size $D_B$ within a range of 200 nm to 10 μm. If the average particle size $D_B$ of the second primary particles is within the range of 200 nm to 10 μm, electronic conductivity inside the secondary particles can further be improved. Also, the second primary particles having the average particle size $D_B$ within the range of 200 nm to 10 μm and the first primary particles can easily form the secondary particles. The average particle size $D_B$ of the second primary particles is preferably within a range of 200 nm to 5 μm.

If the average particle size $D_A$ of first primary particles is smaller than the average particle size $D_B$ of second primary particles, not only an input-and-output improvement effect, but also a cycle-performance improvement effect can be obtained. This is because when the volume of the orthorhombic Na-containing niobium-titanium composite oxide included in the first primary particles changes accompanying a charge and discharge, the electronic conduction path inside the secondary particles is maintained due to the presence of the second primary particles having the average particle size $D_B$ larger than the average particle size $D_A$ of the first primary particles.

On the other hand, if the average particle size $D_A$ of the first primary particles is equal to or larger than the average particle size $D_B$ of the second primary particles, not only input-and-output improvement due to improvement of electronic conductivity are obtained, but also a higher energy density can be achieved.

The ratio $D_A/D_B$ of the average particle sizes is preferably 2.5 or more from the viewpoint of energy density. Also, the ratio $D_A/D_B$ of the average particle sizes is preferably 10 or less. Particularly preferably, the ratio $D_A/D_B$ of the average particle size is within a range of 3 to 7.

The average particle sizes $D_A$ and $D_B$ are each preferably adjusted in accordance with the application of the battery.

The secondary particles including the first primary particles and the second primary particles preferably have an average particle size $D_C$ within the range of 5 μm to 25 μm. An active material for a battery including the secondary particles whose average particle size $D_C$ is within the range of 5 μm to 25 μm makes electrode coating easier when an electrode including the active material is produced. Also, the active material for a battery including the secondary particles whose average particle size $D_C$ is within the range of 5 μm to 25 μm can sufficiently make use of an effect achieved by including the second primary particles and as a result, can achieve more excellent input-and-output performances.

The average particle size $D_C$ of the secondary particles can be adjusted by selecting the granulation method and adjusting granulation conditions.

A mass ratio $W_A/W_B$ of a mass $W_A$ of the first primary particle to a mass $W_B$ of the second primary particle is preferably within a range of $4 \leq W_A/W_B \leq 20$. If the mass ratio $W_A/W_B$ is within the range of $4 \leq W_A/W_B \leq 20$, a more excellent balance between an excellent energy density and an effect of improved electronic conductivity can be established. The mass ratio $W_A/W_B$ is preferably within a range of $5 \leq W_A/W_B \leq 9$.

The secondary particles included in the active material for a battery according to the first embodiment can be in a form where, for example, the first primary particles and the second primary particles are aggregated. In the secondary particles in a form where primary particles are aggregated, a plurality of the primary particles may be in a state of being assembled by an external cohesive force such as a binder. That is, the secondary particles included in the active material for a battery according to the first embodiment can further include the binder. The binder can be positioned between the particles included in the secondary particles.

Examples of the binder include polyvinyl alcohol, carboxymethyl cellulose, and sugars such as sucrose.

The secondary particles preferably include the binder in an amount of 0.2% by mass to 3% by mass with respect to the total mass $W_A+W_B$ of the first primary particles and the second primary particles.

Secondary particles produced by using a binder are different from, for example, a mixture in which particles including different compounds are simply mixed and dispersed. If secondary particles are produced by using a binder, a necking of particles can easily occur by heat treatment so that rigid secondary particles can be formed. Therefore, in secondary particles including in the active material for a battery in this aspect according to the first embodiment in this mode, there can be more contact points between the first primary particle and the second primary particle than in a mixture in which these particles were simply mixed. Therefore, the active material for a battery in this aspect according to the first embodiment can achieve more excellent input-and-output performances than an active material for a battery including a simple mixture of the first primary particles and the second primary particles.

[Manufacturing Method]

The active material for a battery according to the first embodiment can be manufactured by, for example, the following method.

(Production of First Primary Particles)

First, the first primary particles are produced by the following procedure. The first primary particles can be provided by, for example, the following procedure.

The first primary particles including the orthorhombic Na-containing niobium-titanium composite oxide can be synthesized by, for example, the solid-state reaction method. Alternatively, the first composite oxide can also be synthesized by the wet synthesis method such as the sol-gel method and the hydrothermal method. Fine particles can easily be obtained by the wet synthesis.

Hereinafter, an example of the synthesis method by the solid-phase method of the primary particles including an orthorhombic Na-containing niobium-titanium composite oxide represented by the general formula of $Li_{2+v}Na_{2-w}M1_x Ti_{6-y-z}Nb_yM2_zO_{14+\delta}$ will be described.

First, necessary raw materials for the target composition, among Ti sources, Li sources, Na sources, Nb sources, metallic element M1 sources, and metallic element M2 sources, are provided. These raw materials may be, for example, an oxide, a compound or a salt. The above salt is preferably a salt such as carbonate and nitrate that is decomposed at a relatively low temperature to generate an oxide.

Next, the raw materials thus provided are mixed in an appropriate stoichiometric ratio to obtain a mixture. For example, in the case where an orthorhombic Na-containing niobium-titanium composite oxide represented by the composition formula of $Li_2Na_{1.7}Ti_{5.7}Nb_{0.3}O_{14}$ is synthesized, titanium oxide $TiO_2$, lithium carbonate $Li_2CO_3$, sodium carbonate $Na_2CO_3$, and niobium (V) hydroxide $Nb(OH)_5$ are mixed such that the molar ratio of Li:Na:Ti:Nb in the mixture is 2:1.7:5.7:0.3.

When mixing the raw materials, it is preferable to mix after the raw materials are sufficiently ground. By mixing sufficiently ground raw materials, raw materials are more likely to react with each other and the generation of impurities when the orthorhombic Na-containing niobium-titanium composite oxide is synthesized can be suppressed. Furthermore, Li and Na may be mixed more than predetermined amounts thereof. Particularly, the loss of Li during heat treatment is a concern and thus, Li may be input more than the predetermined amount thereof.

Next, the mixture obtained by the above mixing is subjected to heat treatment in the air atmosphere at a temperature within a range of from 800° C. to 1000° C. for a time of 1 hour to 24 hours. If the temperature is 800° C. or lower, it is difficult to obtain adequate crystallinity. On the other hand, if the temperature is 1000° C. or higher, particle growth proceeds too much and coarse particles are formed, which is not preferable. Similarly, if the heat treatment time is less than 1 hour, it is difficult to obtain adequate crystallinity. If the heat treatment time is made longer than 24 hours, particle growth proceeds too much and coarse particles are formed, which is not preferable.

It is preferable to subject the mixture to heat treatment at a temperature within a range of from 850° C. to 950° C. for a time of 2 hours to 5 hours. An orthorhombic Na-containing niobium-titanium composite oxide can be obtained by such heat treatment. The obtained orthorhombic Na-containing niobium-titanium composite oxide may be recovered and then annealed.

For example, an orthorhombic Na-containing niobium-titanium composite oxide represented by the composition formula of $Li_2Na_{1.7}Ti_{5.7}Nb_{0.3}O_{14}$ can be obtained by subjecting the mixture obtained by, as described above, mixing the raw materials to heat treatment in the air atmosphere at 900° C. for 3 hours.

The average particle size $D_A$ of the first primary particles may be adjusted by, for example, the heat treatment temperature and the time.

(Preparation of Second Primary Particles)

On the other hand, the second primary particles including at least one selected from the group consisting of the carbon black, the graphite, TiN, TiC, the lithium titanate having the spinel structure, the $TiO_2$ having the anatasae structure, and the $TiO_2$ having the rutile structure are provided.

The average particle size $D_B$ of the second primary particles can be adjusted by, for example, synthesis conditions and grinding conditions of each material.

(Production of Secondary Particles)

Next, the secondary particles are produced using a plurality of the first primary particles and a plurality of the second primary particles.

The secondary particles can be manufactured by various methods such as wet granulation and dry granulation. In the wet granulation, the secondary particles can be formed by subjecting a solution including a binder to a spray-drying or rolling granulation to produce secondary particles. In the dry granulation, on the other hand, the secondary particles can be formed by compression of particles or physical impacts.

The method of producing secondary particles is not limited, but when wet granulation is used, the spray-drying is preferable. When dry granulation is used, the formation of secondary particles by compression is preferable.

An example of the method of manufacturing the secondary particles is shown. First, an orthorhombic Na-containing niobium-titanium composite oxide $Li_2Na_{1.7}Ti_{5.7}Nb_{0.3}O_{14}$ having an average primary particle size $D_A$ of 3 μm and a rutile-type $TiO_2$ having an average primary particle size $D_B$ of 1 μm are input into a aqueous solution and mixed. A binder for formation of secondary particles, for example, polyvinyl alcohol, is further input into the mixture. The mixture thus obtained is used as a precursor, and formation of secondary particles is performed by a spray-drying device of the two fluid nozzle type. At that time, the drying temperature is set to 120° C. Next, secondary particles thus obtained are subjected to heat treatment at 600° C. for 3 hours. According to the above method, for example, secondary particles having an average secondary particle size $D_C$ of 18 μm, wherein first primary particles including the orthorhombic Na-containing niobium-titanium composite oxide $Li_2Na_{1.7}Ti_{5.7}Nb_{0.3}O_{14}$ and the second primary particles including the rutile-type $TiO_2$ are included, can be produced.

[Analysis Method of Active Material for Battery]

Hereinafter, the analysis method of the active material for a battery will be described.

[Identification Method of Crystal Structure and Composition of Particles Included in Active Material for Battery]

The crystal structure and the composition of particles included in the active material for a battery to be measured can be identified by, for example, using a scanning electron microscope (SEM), an X-ray diffraction (XRD), an energy dispersive X-ray spectroscopy (EDX), and an inductively coupled plasma (ICP) emission spectroscopy in combination.

In the powder X-ray diffraction measurement of an active material, the crystal structure (crystal system) can be identified as follows. First, the value of a scattering angle 2θ is determined from the position of diffraction peak obtained by the XRD measurement. And then, a crystal spacing d is calculated by the Bragg's law. The analysis allows the crystal structure (crystal system) to be identified. Should be noted that known substances can be identified by referring to diffraction data of standard substances such as cards of the Joint Committee on Powder Diffraction Standards (JCPDS).

The powder X-ray diffraction measurement of an active material is made as described below. First, the sample is ground in a mortar. A holder portion having a depth 0.2 mm or more formed on a glass sample plate is filled with the obtained sample. The filled sample is smoothed by using a glass plate. At that time, care must be taken so as to prevent cracks, voids and the like due to insufficient filling with the sample. To correctly determine the peak position, the filling is performed in such a way that unevenness from the reference surface of the holder is generated.

Next, the glass plate filled with the sample is placed in a powder X-ray diffraction device and a diffraction pattern is obtained by using Cu-Kα rays.

The influence of particle orientation may arise due to the particle shape of the sample, leading to a deviation of the peak position or changes of the intensity ratio. In such a case, the influence can be checked by filling a capillary made of Lindemann glass with the same sample and making measurements using a rotary sample stand.

The measurement can be performed by using Cu-Kα rays as a radiation source and setting a measurement range to a range of $10°\leq 2\theta \leq 90°$ to obtain the X-ray diffraction pattern.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5°\leq 2\theta \leq 90°$. When another apparatus is used, measurement using a standard Si powder for powder X-ray diffraction is performed under conditions where a peak intensity and a peak top position correspond to those by obtained using the above apparatus so as to obtain measurement results equivalent to those described above.

The x-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The estimation of the crystal structure is performed based on the analysis results of EDX and ICP as described below. The parameters of the crystal structure (lattice constant, atomic coordinate, and occupancy ratio or the like) can be precisely analyzed by fitting all the calculated values and measurement values. Thereby, the characteristics of the crystal structure of the synthesized composite oxide can be determined. The site occupancy ratio of constitutional elements in each of the sites can be examined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation a; must be taken into consideration. The fitting parameter S and standard deviation $\sigma_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

When the orthorhombic Na-containing niobium-titanium composite oxide is included in the active material to be measured, an X-ray diffraction pattern assigned to the orthorhombic system such as the space group of Cmca or Fmmm can be obtained by the X-ray diffraction measurement.

On the other hand, when at least one selected from the group consisting of the carbon black, the graphite, TiN, TiC, the spinel-type lithium titanate, anatase-type $TiO_2$, and the rutile-type $TiO_2$ is included in the active material to be measured, an X-ray diffraction pattern derived from the carbon black, the graphite, TiN, TiC, the spinel-type lithium titanate, the anatase-type $TiO_2$, and/or the rutile-type $TiO_2$ can be observed by X-ray diffraction measurement.

In other words, if such an X-ray diffraction pattern is verified, it is found that the powder to be measured includes the orthorhombic compounds, and at least one selected from the group consisting of the carbon black, the graphite, TiN, TiC, the spinel-type lithium titanate, the anatase-type $TiO_2$, and the rutile-type $TiO_2$. Incidentally, among materials that can be included in the second primary particles, there may be one the verification of which is difficult if the content thereof is small or crystallinity thereof is low.

Next, particles are observed according to the following procedure by using a scanning electron microscope (SEM) and energy dispersive X-ray spectroscopy (EDX) in combination.

First, a powder of an active material to be measured is observed through the scanning electron microscope (SEM). A sample is sampled in an inert atmosphere such as argon and nitrogen while avoiding contact with the air.

Some particles are selected randomly using an SEM observation image at a magnification of 3000. At that time, the particles are selected so that the particle size distribution of the selected particles is as broad as possible.

Subsequently, each of the selected particles is subjected to elemental analysis by energy dispersive X-ray spectroscopy (EDX). Thus, it is possible to identify the kind and amount of elements other than Li among the elements included in each of the selected particles. As for Li, it is possible to obtain information on the content of Li in the whole active material by inductively coupled plasma (ICP) atomic emission spectrometry, to be described later.

If the observed particle contains Na, Ti, Nb, and O and further, an X-ray diffraction pattern assigned to the orthorhombic system is obtained from the active material to be measured by the above XRD measurement, it is found that particles of an orthorhombic Na-containing niobium-titanium composite oxide are present in the active material to be measured.

Furthermore, if secondary particles are observed in an SEM observation image, the composition analysis of primary particles in the observed secondary particles is conducted by EDX.

If primary particles from which carbon is detected in 95% by mass or more are present in secondary particles, a carbon black and/or a graphite is considered to be included. Further, if it is known that primary particles of an orthorhombic Na-containing niobium-titanium composite oxide are present, it is possible to verify that secondary particles to be measured are secondary particles in which first primary particles including the orthorhombic Na-containing niobium-titanium composite oxide and second primary particles including the carbon black and/or the graphite are aggregated.

Similarly, if titanium and nitrogen are detected by EDX in the molar ratio of $0.9\leq Ti/N\leq 1.1$, the presence of primary particles in which the total of titanium and nitrogen occupies 95% by weight or more of the whole particles in secondary particles to be measured is verified by SEM-EDX, and further an XRD pattern of TiN is verified by XRD measurement of the active material including the secondary particles, the presence of primary particles including TiN in the secondary particles can be verified.

For TiC, a spinel-type lithium titanate, an anatase-type $TiO_2$, and a rutile-type $TiO_2$, whether primary particles including any of these compounds are included in secondary particles to be measured can be confirmed by using SEM-EDX and XRD measurement in combination.

Using the above method, each of first primary particles including an orthorhombic Na-containing niobium-titanium composite oxide and second primary particles including at least one selected from the group consisting of a carbon black, a graphite, TiN, TiC, a spinel-type lithium titanate, an anatase-type $TiO_2$, and a rutile-type $TiO_2$ can be identified in an SEM image of the active material for a battery to be measured.

The amount of element including in an active material for a battery can be identified by inductively coupled plasma (ICP) emission spectroscopy following the procedure below.

First, an active material for a battery to be measured is dissolved by acid to prepare a liquid sample. At that time, hydrochloric acid, nitric acid, sulfuric acid, hydrogen fluoride or the like can be used as acid. By subjecting the liquid sample to ICP emission spectrochemical analysis, the concentrations of elements included in the active material for a battery to be measured can be known.

The crystal structure model used to calculate an XRD diffraction pattern by the Rietveld method described previously can be estimated by using results of analysis of elements other than Li of each particle included in the active material to be measured by SEM-EDX described above and analysis results of element concentration in the whole active material by ICP described above in combination.

[Form Observation of Particles Included in Active Material for Battery]

In the SEM observation described previously of the active material for a battery, an image of a powder of the active material is obtained in the magnification of 3000 times. In the obtained field of view, a group of particles where the fact that the primary particles are in contact with each other confirmed is defined as secondary particles.

The size of a primary particle is determined from the diameter of the minimum circle corresponding to the primary particle. More specifically, the particle size is measured 10 times based on an SEM image of the magnification of 3000 times and the average value of the diameter of the minimum circle obtained in each image is defined as the primary particle size. For the calculation of the average value, the maximum value and the minimum value of the particle size of measurements of 10 times are not used.

The primary particle size of 10 primary particles identified as the first primary particles by the method described previously is measured. The average value of the measured primary particle sizes is defined as an average primary particle size $D_A$ of the first primary particles. Similarly, the primary particle size of 10 primary particles identified as the second primary particles by the method described previously is measured. The average value of the measured primary particle sizes is defined as an average primary particle size $D_B$ of the second primary particles.

A secondary particle size $D_C$ is measured by a method similar to that of primary particles. That is, the diameter of the minimum circle corresponding to the secondary particle. More specifically, the particle size is measured 10 times in an SEM image of the magnification of 3000 times and the average value of the diameter of the minimum circle obtained in each image is defined as the secondary particle size. For the calculation of the average value, the maximum value and the minimum value of the particle size of measurements of 10 times are not used.

[Active Material for Battery Including in Battery]

The composition, crystal structure, and particle size of particles included in an active material for a battery incorporated into a battery can be confirmed by the following procedures.

First, to grasp a crystalline state of the active material, a state in which lithium ions were extracted from the active material to be measured is created. Incidentally, the orthorhombic Na-containing niobium-titanium composite oxide includes lithium that is not involved in a charge and discharge in the structure thereof. Thus, "the state in which lithium ions are extracted" means a state in which lithium involved in a charge and discharge is extracted. For example, when the active material for a battery to be measured is included in the negative electrode, the battery is put into a completely discharged state. However, even in a state in which the battery is discharged, lithium ions remaining in the active material for a battery may be present. Therefore, care must be taken when analyzing an X-ray diffraction pattern.

Next, the battery put into such a state is disassembled in a glove box filled with argon. An electrode including the active material for a battery to be measured is taken out of the disassembled battery. The electrode is washed with an appropriate solvent. For example, ethylmethyl carbonate may be used. If washing is insufficient, an impurity phase such as lithium carbonate and lithium fluoride may be mixed under the influence of lithium ions remaining in the electrode. In such a case, a tight container allowing a measuring atmosphere in an inert gas may be used.

The cross section of the electrode taken out as described above is cut out by an ion milling device. The cross section of the cut-out electrode is observed through the scanning electron microscope (SEM) described previously. Sampling is performed in an inert atmosphere such as argon or nitrogen without being exposed to the air.

As described above, some particles are selected using an SEM observation image at a magnification of 3000. At that time, the particles are selected so that the particle size distribution of the selected particles is as broad as possible.

Subsequently, each of the selected particles is subjected to elemental analysis by energy dispersive X-ray spectroscopy (EDX). Thus, it is possible to identify the kind and amount of elements other than Li among the elements included in each of the selected particles.

The crystal structure of the compound included in each particle selected through the SEM can be identified by the X-ray diffraction (XRD) measurement described above.

The XRD measurement of the electrode can be performed by cutting the electrode to be measured into a size having the same area of the holder of the wide-angle X-ray diffractometer and directly attaching the cut electrode to the glass holder, and measuring it. At this time, XRD is measured in advance with regard to the kind of the metal foil of the electrode current collector to determine a position where a peak originating from the current collector appears. Furthermore, it is necessary to determine in advance whether or not there are peaks originated from the ingredients such as a conductive agent and binder. When the peak of the current collector is overlapped on the peak of the active material, it is desired to separate the active material from the current collector prior to the measurement. This is to separate the overlapped peaks and to measure the peak intensity quantitatively. Of course, the procedure may be omitted if these data have been determined in advance. Although the electrode may be separated physically, it is easily separated by applying ultrasonic waves in a solvent. Then, the electrode recovered in this manner can be subjected to wide-angle X-ray diffraction for the active material.

The composition of the whole active material included in the electrode can be measured by the following procedure.

First, the electrode including an active material to be measured is taken out of the nonaqueous electrolyte battery and washed, according to the procedures described above.

Using a portion of the washed electrode, the composition of first primary particles included in the electrode and that of second primary particles are identified by the method described above.

On the other hand, another portion of the washed electrode is put into an appropriate solvent to apply an ultrasonic wave thereto. For example, by putting an electrode body into ethylmethyl carbonate in a glass beaker and vibrating the electrode body in an ultrasonic washer, an electrode layer including the electrode active material can be peeled off a current collector substrate. Next, the peeled electrode layer is dried under reduced pressure. By grinding the obtained electrode layer in a mortar or the like, a powder including the active material to be measured, a conductive auxiliary, a binder and the like is obtained. By dissolving the powder by acid, a liquid sample including the active material can be prepared. At that time, hydrochloric acid, nitric acid, sulfuric acid, hydrogen fluoride or the like can be used as acid. By subjecting the liquid sample to ICP emission spectral analysis, the concentrations of elements included in the active material included in the electrode can be found.

By using combination of the identification of the composition by SEM and EDX, the identification of the crystal structure by XRD, and results of ICP emission spectrochemical analysis for each particle included in the electrode, the composition and the crystal structure of compound contained in each particle can be identified.

Also, from an SEM observation image of the electrode, the average primary particle size $D_A$ of the first primary particles, the average primary particle size $D_B$ of the second primary particles, and the average secondary particle size $D_C$ of the secondary particles can be measured by procedures similar to those described above.

If the peak of an electrode substrate and that of an active material overlap when X-ray diffraction measurements of the electrode are made, it is preferable to make measurements by peeling the active material off the substrate. This is necessary to measure peak intensities correctly. The active material can be peeled off the substrate by soaking the electrode in a solvent of ethylmethyl carbonate or the like and applying an ultrasonic wave. Then, a electrode body powder (including the active material, a conductive aid, and a binder) is recovered by volatilizing the solvent, and a capillary made of Lindemann glass or the like is filed with this powder, and then a powder X-ray diffraction for this powder can be measured. Also, the electrode body powder recovered in the same manner can be subjected to various analyses including the procedures for verifying the active material for a battery described above.

Next, an example of the active material for a battery according to the first embodiment will be described with reference to the drawings.

Figure 2:
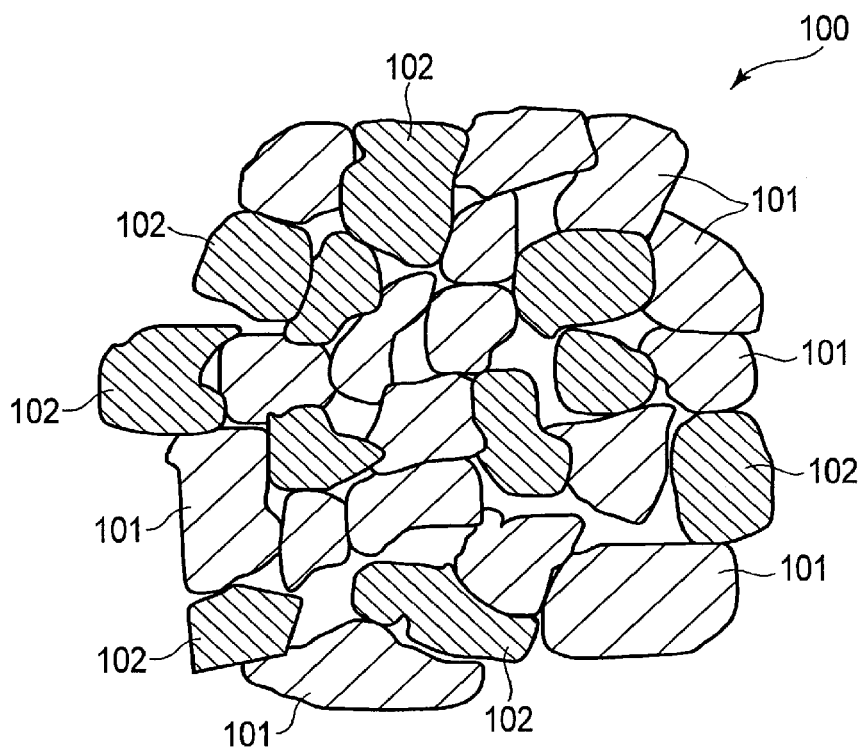
FIG. 2 is a schematic cross-sectional view of an example of an active material for a battery according to a first embodiment.

FIG. 2 is a schematic cross-sectional view of an example of an active material for a battery according to a first embodiment.

An active material 100 for a battery shown in FIG. 2 includes a plurality of first primary particles 101 and a plurality of second primary particles 102. The first primary particles 101 and second primary particles 102 are aggregated to constitute secondary particles.

As shown in FIG. 2, a portion of the second primary particles 102 is sandwiched between the first primary particles 101. Also, a portion of the second primary particles 102 exists inside secondary particles.

The second primary particle 102 sandwiched between the first primary particles can serve as a conductive path between the first primary particles sandwiching the second primary particle therebetween.

According to the first embodiment, an active material for a battery is provided. The active material for a battery includes secondary particles. The secondary particles include first primary particles and second primary particles. The first primary particles include an orthorhombic Na-containing niobium-titanium composite oxide. Second primary particles include at least one selected from the group consisting of a carbon black, a graphite, a titanium nitride, a titanium carbide, a lithium titanate having a spinel structure, a titanium dioxide having an anatase structure, and a titanium dioxide having a rutile structure. Second primary particles can exhibit high conductivity and increase conductivity of secondary particles including the first primary particles. Thus, the active material for a battery according to the first embodiment can provide a nonaqueous electrolyte battery capable of exhibiting excellent input-and-output performances.

Second Embodiment

According to a second embodiment, there is provided a nonaqueous electrolyte battery. The nonaqueous electrolyte battery includes a positive electrode, a negative electrode, and nonaqueous electrolyte. The negative electrode includes the active material for a battery according to the first embodiment.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode may include a current collector and a negative electrode layer (negative electrode active material-containing layer). The negative electrode layer may be formed on one surface or both surfaces of the current collector. The negative electrode layer may include a negative electrode active material and also optionally a conductive agent and a binder.

An active material for a battery according to the first embodiment may be contained in the negative electrode layer as a negative electrode active material.

The conductive agent can have the effect of improving current collecting performance and suppressing contact resistance between the negative electrode active material and the current collector. Examples of the conductive agent include carbonaceous substances such as acetylene black, carbon black, graphite, carbon nanofiber, and carbon nanotube. These carboneous substances may be used singly or a plurality of the carbonaceous substances may be used.

The binder can have the effect of binding the negative electrode active material, the conductive agent, and the negative electrode current collector. Examples of the binder include polytetrafluoro ethylene (PTFE), polyvinylidene difluoride (PVdF), fluororubber, styrene-butadiene rubber, acrylic resin and copolymers thereof, polyacrylic acid, and polyacrylonitrile.

As for the blending ratio of the negative electrode active material, the conductive agent, and the binder is preferably in the range of 70% by mass or more and 96% by mass or less for the negative electrode active material, 2% by mass or more and 28% by mass or less for the conductive agent, and 2% by mass or more and 28% by mass or less for the binder. The amount of the conductive agent is set to 2% by mass or more, whereby the current-colielting performance of the negative electrode layer can be improved and then excellent large current characteristics can be expected. Also, the amount of the binder is set to 2% by mass or more, whereby sufficient binding properties between the negative electrode layer and the current collector can be obtain and then excellent cycle characteristics can be expected. From the viewpoint of higher capacities, on the other hand, the conductive agent and the binder are each preferably set to 28% by mass or less.

The negative electrode current collector is preferably formed from aluminum foil or aluminum alloy foil including elements such as Mg, Ti, Zn, Mn, Fe, Cu, and Si.

The negative electrode is produced by, for example, the following method. First, a negative electrode active material, a conductive agent, and a binder are suspended in a solvent to prepare a slurry. At that point, if the dispersion strength is excessively strong, secondary particles may collapse and thus, it is preferable to adopt the dispersion with weak dispersion strength.

The slurry prepared as described above is applied to one surface or both surfaces of the negative electrode current collector and next, the coated film is dried. In this manner, a negative electrode layer can be formed. Then, the negative electrode layer is pressed. When pressing the electrode, secondary particles in the negative electrode layer may collapse if pressing is excessive to increase the electrode density. Therefore, a attention should be paid to the pressing pressure.

For example, a negative electrode included in a nonaqueous electrolyte battery according to the second embodiment can be manufactured by the procedures described in detail in Examples below.

2) Positive Electrode

The positive electrode can include a current collector and a positive electrode layer (positive electrode active material-containing layer). The positive electrode layer may be formed on one surface or both surfaces of the current collector. The positive electrode layer can include a positive electrode active material, and optionally a conductive agent and a binder.

The positive electrode active material may be, for example, an oxide or a composite oxide. Lithium can be inserted into the oxide and the composite oxide, and be extracted from them. Examples of the oxide and composite oxide include a manganese dioxide ($MnO_2$), a iron oxide, a cupper oxide, a nickel oxide, a lithium manganese composite oxide (e.g., $Li_xMn_2O_4$ or $Li_xMnO_2$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yMn_zO_2$), a lithium nickel cobalt aluminum composite oxide (e.g., a lithium manganese nickel composite oxide having a spinel structure (e.g., $Li_xMn_{2-y}Ni_yO_4$), a lithium phosphorus oxide having an olivine structure (e.g., $Li_xFePO_4$, $Li_xMnPO_4$, $Li_xMn_{1-y}Fe_yPO_4$, and $Li_xC_oPO_4$), an iron sulfate (e.g., $Fe_2(SO_4)_3$), and a vanadium oxide (e.g., $V_2O_5$). In the above-described formula, the ranges of $0<x\le1$, $0<y\le1$, and $0\le z\le1$ are preferably. As the active material, one of these compounds may be used singly, or combination of two or more of the compounds can be used.

Among these, a lithium manganese composite oxide (e.g., $Li_xMn_2O_4$), a lithium cobalt composite oxide (e.g., $Li_xC_oO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yNn_zO_2$) and a lithium phosphorus oxide having an olivine structure (e.g., $Li_xFePO_4$, $Li_xMnPO_4$, $Li_xMn_{1-y}Fe_yPO_4$, and $Li_xC_oPO_4$) are preferable. In the above-described formula, the ranges of $0<x\le1$, $0<y\le1$, and $0\le z\le1$ are preferably.

The conductive agent can have the effect of improving the current collection performance and suppressing the contact resistance of the active material with the current collector. Examples of the conductive agent include carbonaceous substances such as acetylene black, carbon black, graphite, carbon nanofiber, and carbon nanotube. These carbonaceous substances may be used singly or a plurality of the carbonaceous substances may be used.

The binder can have the effect of binding the active material, the conductive agent, and the current collector. Examples of the binder include polytetrafluoroethylene (PTFE), polyvinylidene fluoride (PVdF), fluorine-based rubber, styrene butadiene rubber, acrylic resin, copolymers of acrylic resin, polyacrylic acid, and polyacrylonitrile.

As for the blending ratio of the positive electrode active material, the conductive agent and the binder in the positive electrode layer, it is preferable that the content of the positive electrode active material is from 80% by mass to 95% by mass, the content of the conductive agent is from 3% by mass to 17% by mass, and the content of the binder is from 2% by mass to 17% by mass. The amount of the conductive agent is set to 3% by mass or more, whereby the above-described effect can be obtained. The amount of the conductive agent is set to 18% by mass or less, whereby decomposition of a nonaqueous electrolyte at a surface of the conductive agent can suppressed during the storage at a high temperature. The amount of the binder is set to 2% by mass or more, whereby the sufficient strength of the electrode can be obtained. If the amount of the binder is set to 17% by mass, a content of the binder, which is an insulating material, in the positive electrode is decreased, and therefore, an internal resistance can be decreased.

The current collector is preferably an aluminum foil, or an aluminum alloy foil containing one or more elements selected from Mg, Ti, Zn, Mn, Fe, Cu, and Si.

The positive electrode is produced by, for example, the following procedures. At first, a positive electrode active material, a conductive agent, and a binder are suspended in a solvent to prepare a slurry. The slurry is applied to one surface or both surfaces of a positive electrode current collector, the coated film is dried. Thus, a positive electrode layer can be obtained. And then, the layer is subjected to a pressing. Alternatively, a positive electrode active material, a conductive agent, and a binder are formed into pellets, and then, the pellets can be used as a positive electrode active material layer.

3) Nonaqueous Electrolyte

The nonaqueous electrolyte may be, for example, a liquid nonaqueous electrolyte or gel-like nonaqueous electrolyte. The liquid nonaqueous electrolyte is prepared by dissolving an electrolyte in an organic solvent. The concentration of the electrolyte is preferably within a range of 0.5 mol/L to 2.5 mol/L. The gel-like nonaqueous electrolyte can be prepared by mixing a liquid nonaqueous electrolyte and a polymer material to obtain a composite.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$]. One electrolyte of these electrolytes can be used alone, or two or more electrolytes of these electrolytes can be used in mixture. The electrolyte preferably includes $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); acetonitrile (AN), and sulfolane (SL). One of these organic solvents can be used alone or two or more solvent can be used as a mixed solvent.

More preferred examples of organic solvent include a mixed solvent which is prepared by mixing two or more solvent selected from the group consisting of propylene carbonate (PC), ethylene carbonate (EC), diethyl carbonate (DEC), and methyl ethyl carbonate (MEC). By using such a mixed solvent, a nonaqueous electrolyte battery which is excellent in high-temperature characteristics and low-temperature characteristics can be obtained. Furthermore, an additive can be added to the nonaqueous electrolyte.

4) Separator

As the separator, for example, a porous film formed from materials such as polyethylene, polypropylene, polyethylene terephthalate, cellulose, and polyvinylidene fluoride (PVdF), nonwoven fabric made of synthetic resin or the like can be used. Further, a separator obtained by applying an inorganic compound to a porous film can also be used.

(5) Container Member

As the container member, for example, a bag-like container made of laminate film or a metallic container is used.

As the shape thereof, the flat shape, square shape, cylindrical shape, coin shape, button shape, sheet shape, and stack shape can be cited. It is needless to say that in addition to a small battery mounted on mobile electronic devices, the nonaqueous electrolyte battery may also be a large battery mounted on two-wheeled to four-wheeled automobiles.

As the laminate film, for example, a multilayer film in which a metal layer is sandwiched between resin films can be used. The laminate film used as a container member is not limited to one in which a metal layer is sandwiched between resin films, a multilayer film consisting of a metal layer and resin layers covered the metal layer can be also used.

The metal layer is preferably aluminum foil or aluminum alloy foil to reduce the weight thereof. As the resin film, for example, a polymeric material such as polypropylene (PP), polyethylene (PE), nylon, and polyethylene terephthalate (PET) can be used. The laminate film can be formed into the shape of a container member by performing heat sealing. The laminated film preferably has a thickness of 0.2 mm or less.

The container made of metal can be formed from, for example, aluminum or an aluminum alloy. The aluminum alloy preferably contains an element such as magnesium, zinc, or silicon. On the other hand, the content of transition metal such as iron, copper, nickel, and chromium is preferably reduced to 100 ppm or less. Whereby, long-term reliability and heat dissipation properties in a high-temperature environment can remarkably be improved.

The wall thickness of the container made of metal is preferably 0.5 mm or less and particularly preferably 0.2 mm or less.

(6) Negative Electrode Terminal

The negative electrode terminal is preferably formed from a material that is electrically stable and has conductivity at a potential in the range of 0.8 V to 3.0 V with respect to the oxidation-reduction potential of lithium. More specifically, the negative electrode terminal is preferably formed from aluminum or an aluminum alloy including an element such as Mg, Ti, Zn, Mn, Fe, Cu, and Si. To reduce contact resistance with the negative electrode current collector, the negative electrode terminal is preferably formed from a material similar to that of the negative electrode current collector.

(7) Positive Electrode

The positive electrode terminal is preferably formed from a material that is electrically stable and has conductivity at a potential in the range of 3.0 V to 4.5 V with respect to the oxidation-reduction potential of lithium. More specifically, the positive electrode terminal is preferably formed from aluminum or an aluminum alloy containing an element such as Mg, Ti, Zn, Mn, Fe, Cu, and Si. To reduce contact resistance with the positive electrode current collector, the positive electrode terminal is preferably formed from a material similar to that of the positive electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 3 and 4.

Figure 3:
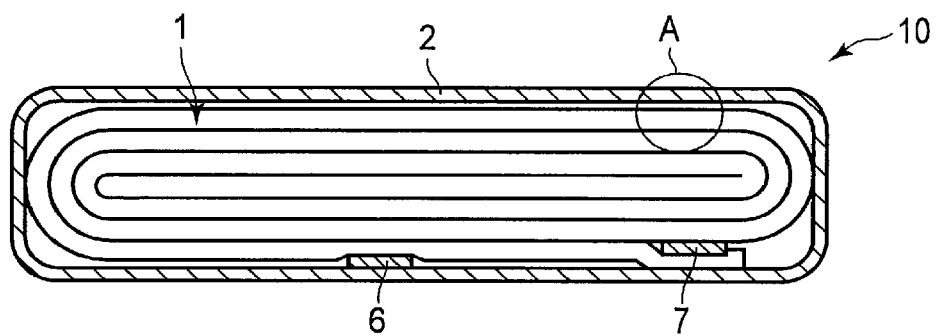
FIG. 3 is a schematic cross-sectional view of an example of a nonaqueous electrolyte battery according to a second embodiment.

FIG. 3 is a schematic cross-sectional view of an example of a nonaqueous electrolyte battery according to a second embodiment. FIG. 4 is an enlarged cross-sectional view of an A portion in FIG. 3

Figure 4:
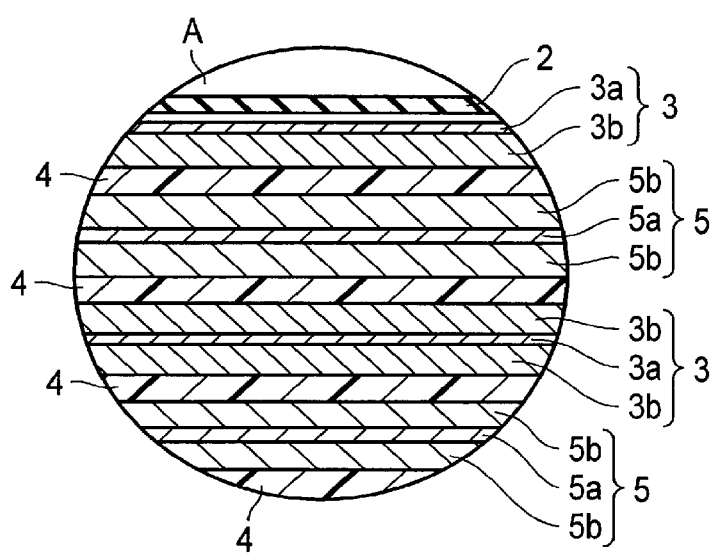
FIG. 4 is an enlarged cross-sectional view of an A portion in FIG. 3.

A nonaqueous electrolyte battery 10 shown in FIGS. 3 and 4 includes a bag-shaped container member 2 shown in FIG. 3, an electrode group 1 shown in FIGS. 3 and 4, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 3, the electrode group 1 is a coiled electrode group in a flat form. The coiled electrode group 1 in a flat form is formed by, as shown in FIG. 4, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. A part of the negative electrode 3 located in the outermost layer has a configuration in which a negative electrode layer 3b is formed on one surface which is the internal surface of a negative electrode current collector 3a as shown in FIG. 4. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 3, in the vicinity of the outer peripheral edge of the coiled electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 3 and 4 can be produced according to the following procedure, for example. First, an electrode group 1 is produced. The electrode group 1 is then enclosed in a bag-shaped container member 2. At that time, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the coiled electrode group 1 and the liquid state nonaqueous electrolyte are completely sealed.

Figure 5:
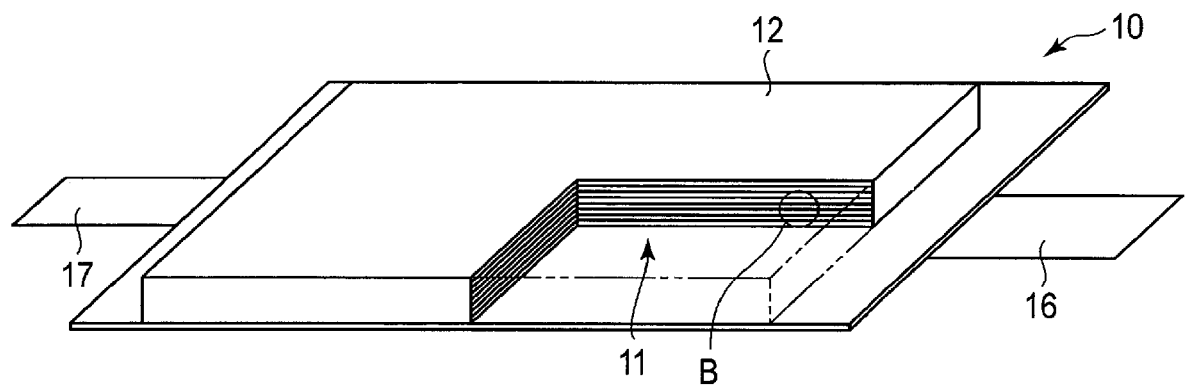
FIG. 5 is a partially cutaway perspective view schematically showing another example of a nonaqueous electrolyte battery according to the second embodiment.
Figure 6:
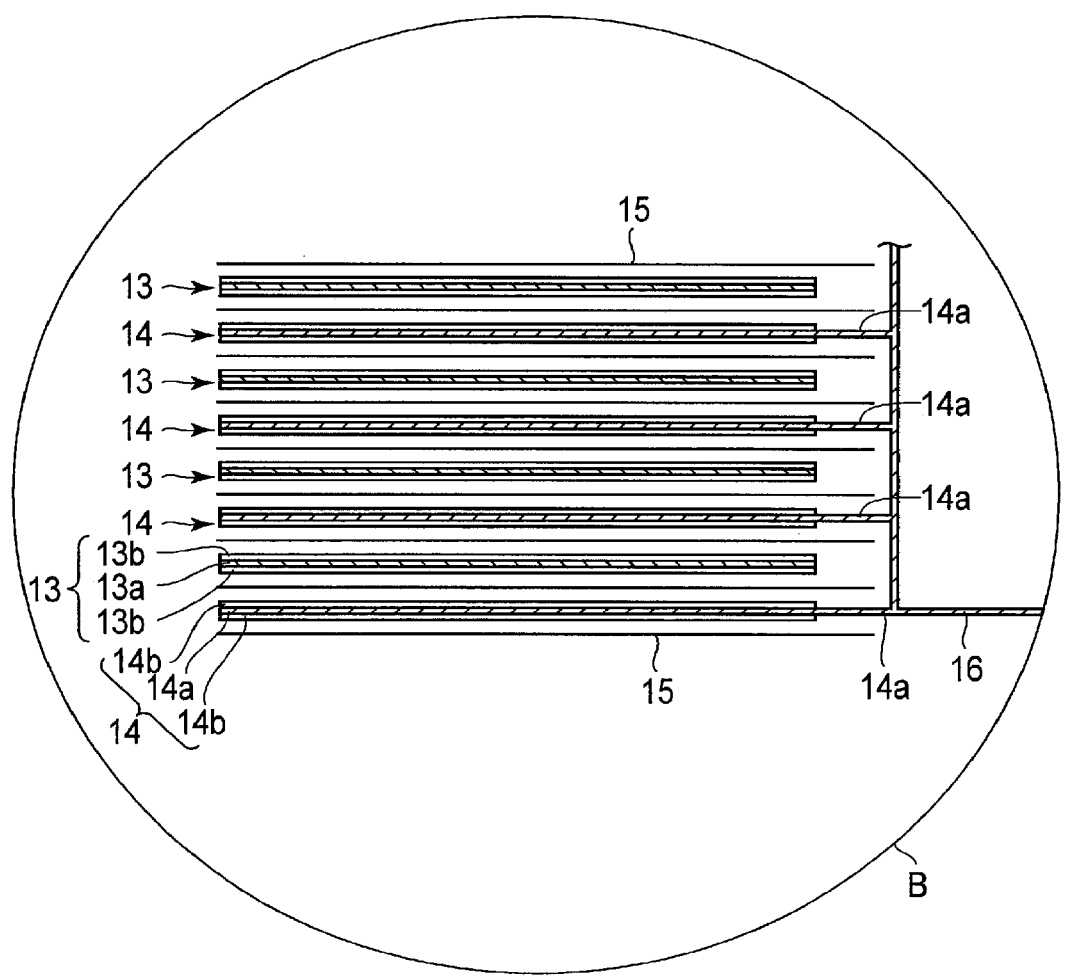
FIG. 6 is an enlarged cross-sectional view of a B portion in FIG. 5.

The nonaqueous electrolyte battery according to the second embodiment is not limited to the nonaqueous electrolyte battery as an example shown in FIGS. 3 and 4, and may be, for example, a battery having a structure shown in FIGS. 5 and 6.

FIG. 5 is a partially cutaway perspective view schematically showing another example of a nonaqueous electrolyte battery according to the second embodiment. FIG. 6 is an enlarged cross-sectional view of a B portion in FIG. 5.

A nonaqueous electrolyte battery 10 shown in FIGS. 5 and 6 includes an electrode group 11 shown in FIGS. 5 and 6, a container member 12 shown in FIG. 5, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 6, the electrode group 11 is a stacked electrode group. As shown in FIG. 6, the stacked electrode group 11 has a structure in which positive electrodes 13 and negative electrodes 14 are alternately laminated with a separator 15 sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the positive electrode current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment includes the active material for a battery according to the first embodiment. Therefore, the nonaqueous electrolyte battery according to the second embodiment can exhibit excellent input-and-output performances.

Third Embodiment

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The plurality of nonaqueous electrolyte batteries can be electrically connected in series, in parallel, or with a combination of series connection and parallel connection to constitute a battery module. The battery pack according to the third embodiment may include a plurality of battery modules.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, a battery pack as an example according to the third embodiment will be described with reference to the drawings.

Figure 8:
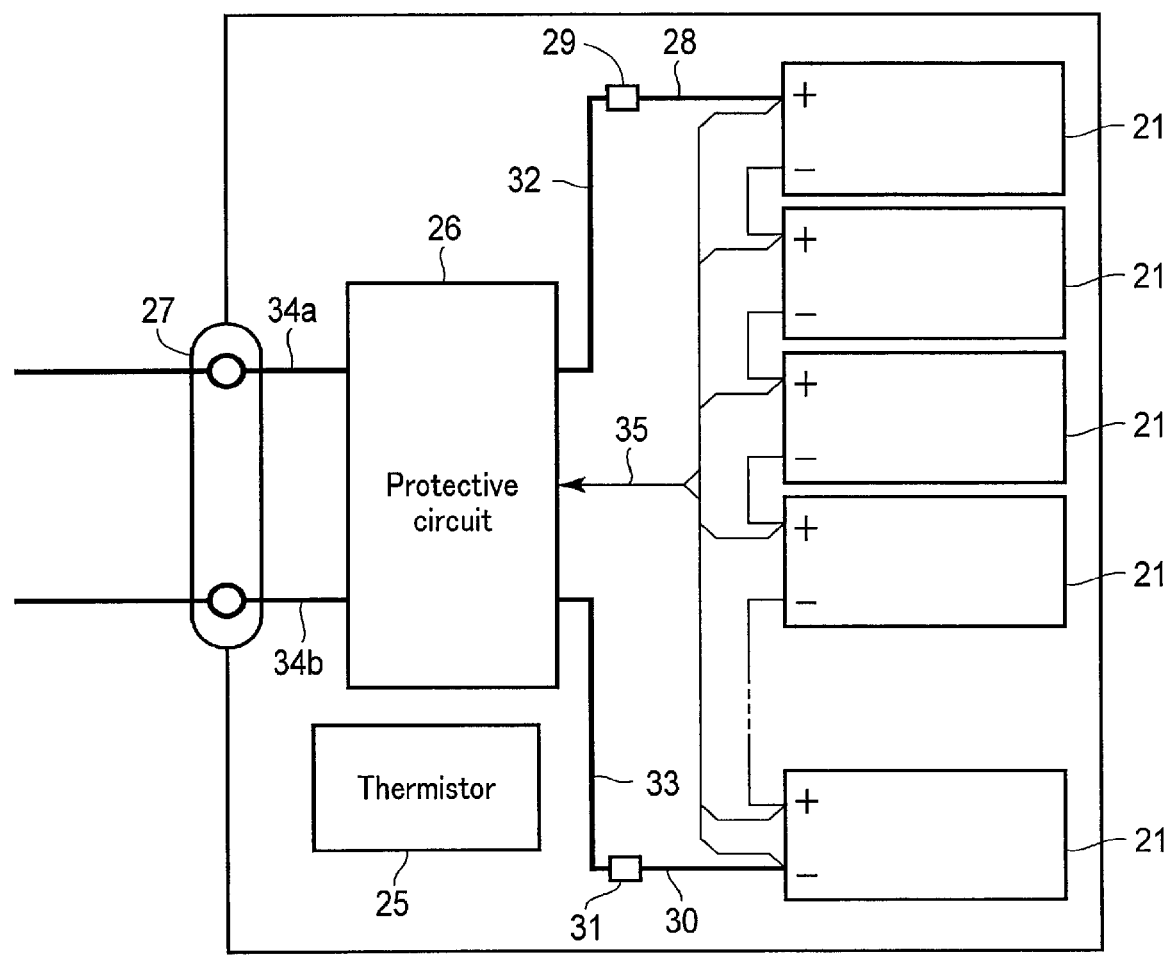
FIG. 8 is a block diagram showing an electric circuit of the battery pack in FIG. 7.

FIG. 7 is an exploded perspective view showing one example of a battery pack according to a third embodiment. FIG. 8 is a block diagram showing an electric circuit of the battery pack in FIG. 7.

A battery pack 20 shown in FIGS. 7 and 8 includes a plurality of unit cells 21. Each of the plurality of unit cells 21 is flat nonaqueous electrolyte battery 10 described with reference to FIGS. 3 and 4.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 8.

A printed wiring board 24 is arranged opposed to the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 8. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 7 and 8, wirers 35 for voltage detection are connected to each of the unit cells 21. Detection signals are sent to the protective circuit 26 through the wirers 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 7 and 8, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and trains (electric trains).

Figure 9:
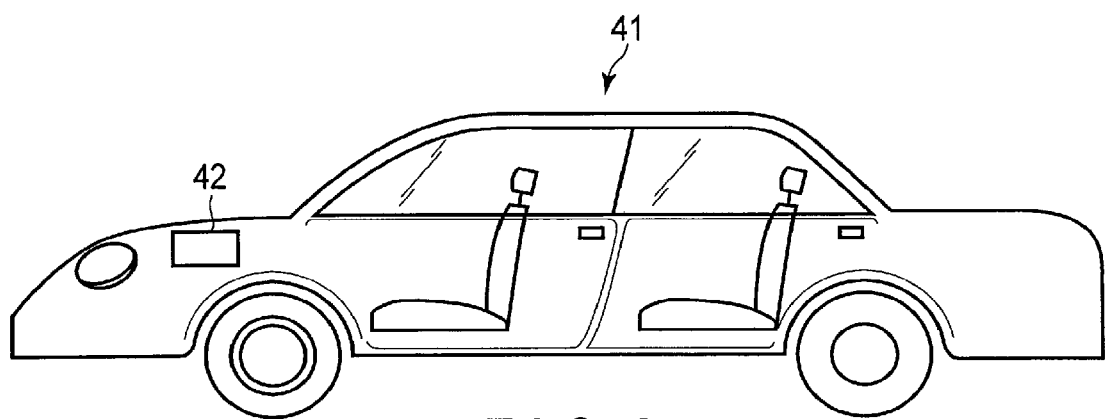
FIG. 9 is a schematic sectional view showing an example of an automobile which includes an example of a battery pack according to a third embodiment.

FIG. 9 shows an example of an automobile which includes a battery pack according to the third embodiment.

The automobile 41 shown in FIG. 9 includes a battery pack 42 which is an example of the battery Pack according to the third embodiment mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Therefore, the battery pack according to the third embodiment can exhibit excellent input-and-output performances.

EXAMPLES

Hereinafter, the present invention will be described with reference to the Examples, but should not be limited to these Examples without departing from the spirit of the present invention.

Example 1

In Example 1, an active material for a battery and an electrode in Example 1 were produced according to the following procedures.

[Providing of First Primary Particles]

First, titanium dioxide $TiO_2$, lithium carbonate $Li_2CO_3$, sodium carbonate $Na_2CO_3$, and niobium (V) hydroxide $Nb(OH)_5$ were provided as raw materials.

Next, titanium dioxide $TiO_2$, lithium carbonate $Li_2CO_3$, sodium carbonate $Na_2CO_3$, and niobium (V) hydroxide $Nb(OH)_5$ were mixed such that the molar ratio of Li:Na:Ti:Nb in the mixture is 2:1.7:5.7:0.3.

Next, the mixture obtained by the above mixing was subjected to a heat treatment in the air atmosphere at 900° C. for 3 hours.

In this manner, first primary particles were obtained. The obtained first primary particles were verified by the method described above that the particles were primary particles of the orthorhombic Na-containing niobium-titanium composite oxide $Li_2Na_{1.7}Ti_{5.7}Nb_{0.3}O_{14}$ whose average primary particle size was 3 μm.

[Production of Secondary Particles]

Next, second primary particles of spinel-type lithium titanate $Li_4Ti_5O_{12}$ whose average primary particle size is 1 μm were provided.

First primary particles obtained by the method described above and second primary particles of lithium titanate were input into a solution of carboxymethyl cellulose as a binder for forming secondary particles to prepare a slurry. At that time, the ratio of a mass $W_A$ of the first primary particle and a mass $W_B$ of the second primary particle was set to 4:1. The carboxymethyl cellulose was added in 0.8% by mass to the total mass $W_A+W_B$ of the first primary particles and the second primary particles.

The slurry obtained as described above was sprayed by the two fluid nozzle method for granulation. At that time, the drying temperature was set to 120° C.

Next, the obtained secondary particles were subjected to heat treatment at 600° C. for one hour. In this manner, an active material for a battery in Example 1 was obtained. The average secondary particle size of the secondary particles of the active material for a battery was 15 μm.

[Production of Electrode]

Next, an acetylene black as a conductive agent and polyvinylidene difluoride (PVdF) as a binder were provided.

Next, the active material for a battery in Example 1, the acetylene black, and the PVdF were added in the mixing ratio of 90% by mass:5% by mass:5% by mass to N-methylpyrrolidone (NMP) as a solvent and mixed. The mixture thus obtained was further dispersed using a planetary centrifugal mixer to prepare a slurry. The slurry was applied to both surfaces of a current collector made of aluminum foil whose thickness is 15 μm to obtain a coated film. Next, the coated film was subjected to drying and pressing. In this manner, an electrode in Example 1 whose electrode density (excluding the current collector) was 2.3 g/cm³ was obtained.

Examples 2 to 7

In Examples 2 to 7, active materials for a battery in Examples 2 to 7 were produced in the same manner as in Example 1 except that instead of the second primary particles of the lithium titanate, second primary particles described below were used.

In Example 2, anatase-type $TiO_2$ whose average primary particle size was 1 μm was used. In Example 3, rutile-type $TiO_2$ whose average primary particle size was 1 μm was used. In Example 4, carbon black whose average primary particle size was 0.5 μm was used. In Example 5, graphite whose average primary particle size was 1 μm was used. In Example 6, TiN whose average primary particle size was 1 μm was used. In Example 7, TiC whose average primary particle size was 1 μm was used.

Also in Examples 2 to 7, electrodes in Examples 2 to 7 were produced in the same manner as in Example 1 except that active materials for a battery in Examples 2 to 7 were used.

Example 8

In Example 8, an active material for a battery in Example 8 was produced in the same manner as in Example 3 except that primary particles of an orthorhombic Na-containing niobium-titanium composite oxide $Li_2Na_{1.9}Ti_{5.9}Nb_{0.1}O_{14}$ whose average primary particle size was 3 μm were used as first primary particles.

Primary particles of the orthorhombic Na-containing niobium-titanium composite oxide $Li_2Na_{1.9}Ti_{5.9}Nb_{0.1}O_{14}$ were synthesized in the same manner as for the first primary particles used in Example 1 except that when materials were mixed, titanium dioxide $TiO_2$, lithium carbonate $Li_2CO_3$, sodium carbonate $Na_2CO_3$, and niobium (V) hydroxide $Nb(OH)_5$ were mixed such that the molar ratio of Li:Na:Ti:Nb in the mixture was 2:1.9:5.9:0.1.

Example 9

In Example 9, an active material for a battery in Example 9 was produced in the same manner as in Example 3 except that primary particles of an orthorhombic Na-containing niobium-titanium composite oxide. $Li_2Na_{1.5}Ti_{5.5}Nb_{0.5}O_{14}$ whose average primary particle size was 3 μm were used as first primary particles.

Primary particles of the orthorhombic Na-containing niobium-titanium composite oxide $Li_2Na_{1.5}Ti_{5.5}Nb_{0.5}O_{14}$ were synthesized in the same manner as for the first primary particles used in Example 1 except that when materials were mixed, the titanium dioxide $TiO_2$, the lithium carbonate $Li_2CO_3$, the sodium carbonate $Na_2CO_3$, and the niobium (V) hydroxide $Nb(OH)_5$ were mixed such that the molar ratio of Li:Na:Ti:Nb in the mixture was 2:1.5:5.5:0.5.

Example 10

In Example 10, an active material for a battery in Example 10 was produced in the same manner as in Example 3 except that primary particles of an orthorhombic Na-containing niobium-titanium composite oxide $Li_2NaTi_5NbO_{14}$ whose average primary particle size was 3 μm were used as first primary particles.

Primary particles of the orthorhombic Na-containing niobium-titanium composite oxide $Li_2NaTi_5NbO_{14}$ were synthesized in the same manner as for the first primary particles used in Example 1 except that when materials were mixed, the titanium dioxide $TiO_2$, the lithium carbonate $Li_2CO_3$, the sodium carbonate $Na_2CO_3$, and the niobium (V) hydroxide $Nb(OH)_5$ were mixed such that the molar ratio of Li:Na:Ti:Nb in the mixture was 2:1:5:1.

Example 11

In Example 11, an active material for a battery in Example 11 was produced in the same manner as in Example 3 except that primary particles of an orthorhombic Na-containing niobium-titanium composite oxide $Li_2Na_{1.5}Sr_{0.2}Ti_{5.9}Nb_{0.1}O_{14}$ whose average primary particle size was 3 μm were used as first primary particles.

Primary particles of the orthorhombic Na-containing niobium-titanium composite oxide $Li_2Na_{1.5}Sr_{0.2}Ti_{5.9}Nb_{0.1}O_{14}$ were synthesized in the same manner as the synthesis of the first primary particles in Example 1 excluding the following points. First, a powder of strontium nitrate $Sr(NO_3)_2$ was further used as a raw material. Also, the titanium dioxide, the strontium nitrate, the lithium carbonate, the sodium carbonate, and the niobium (V) hydroxide as raw materials were mixed such that the molar ratio of Li:Na:Sr:Ti:Nb in the mixture was 2:1.5:0.2:5.9:0.1.

Example 12

In Example 12, an active material for a battery in Example 12 was produced in the same manner as in Example 3 except that primary particles of an orthorhombic Na-containing niobium-titanium composite oxide $Li_2Na_{1.5}Ba_{0.2}Ti_{5.9}Nb_{0.1}O_{14}$ whose average primary particle size was 3 μm were used as first primary particles.

Primary particles of the orthorhombic Na-containing niobium-titanium composite oxide $Li_2Na_{1.5}Ba_{0.2}Ti_{5.9}Nb_{0.1}O_{14}$ were synthesized in the same manner as the synthesis of the first primary particles in Example 1 excluding the following points. First, a powder of barium carbonate $BaCO_3$ was further used as a raw material. Also, titanium dioxide, barium carbonate, lithium carbonate, sodium carbonate, and niobium (V) hydroxide as raw materials were mixed such that the molar ratio of Li:Na:Ba:Ti:Nb in the mixture is 2:1.5:0.2:5.9:0.1.

Example 13

In Example 13, an active material for a battery in Example 13 was produced in the same manner as in Example 3 except that primary particles of an orthorhombic Na-containing niobium-titanium composite oxide $Li_2Na_{1.5}Ba_{0.2}Ti_{5.5}Nb_{0.5}O_{14}$ whose average primary particle size was 3 μm were used as first primary particles.

Primary particles of the orthorhombic Na-containing niobium-titanium composite oxide $Li_2Na_{1.5}Ba_{0.2}Ti_{5.5}Nb_{0.5}O_{14}$ were synthesized in the same manner as the synthesis of the first primary particles in Example 12 excluding the following points. In Example 13, titanium dioxide, barium carbonate, lithium carbonate, sodium carbonate, and niobium (V) hydroxide as raw materials were mixed such that the molar ratio of Li:Na:Ba:Ti:Nb in the mixture is 2:1.5:0.2:5.5:0.5.

Example 14

In Example 14, an active material for a battery in Example 14 was produced in the same manner as in Example 3 except that primary particles of an orthorhombic Na-containing niobium-titanium composite oxide $Li_{2.3}Na_{1.9}Ti_{5.8}Nb_{0.1}Al_{0.3}O_{14}$ whose average primary particle size was 3 μm were used as first primary particles.

Primary particles of the orthorhombic Na-containing niobium-titanium composite oxide $Li_{2.3}Na_{1.9}Ti_{5.8}Nb_{0.1}Al_{0.3}O_{14}$ were synthesized in the same manner as the synthesis of the first primary particles in Example 1 excluding the following points. First, a powder of aluminum oxide $Al_2O_3$ was further used as a raw material. Also, the titanium dioxide, the aluminum oxide, the lithium carbonate, the sodium carbonate, and the niobium (V) hydroxide as materials were mixed such that the molar ratio of Li:Na:Ti:Nb:Al in the mixture was 2.3:1.9:5.8:0.1:0.3.

Example 15

In Example 15, an active material for a battery in Example 15 was produced in the same manner as in Example 3 except that primary particles of an orthorhombic Na-containing niobium-titanium composite oxide $Li_2Na_{1.9}Ti_{5.8}Nb_{0.1}Zr_{0.1}O_{14}$ whose average primary particle size was 3 μm were used as first primary particles.

Primary particles of the orthorhombic Na-containing niobium-titanium composite oxide $Li_2Na_{1.9}Ti_{5.8}Nb_{0.1}Zr_{0.1}O_{14}$ were synthesized in the same manner as the synthesis of the first primary particles in Example 1 excluding the following points. First, a powder of zirconium oxide $ZrO_2$ was further used as a raw material. Also, the titanium dioxide, the zirconium oxide, the lithium carbonate, the sodium carbonate, and the niobium (V) hydroxide as raw materials were mixed such that the molar ratio of Li:Na:Ti:Nb:Zr in the mixture is 2:1.9:5.8:0.1:0.1.

Example 16

In Example 16, an active material for a battery in Example 16 was produced in the same manner as in Example 3 except that primary particles of an orthorhombic Na-containing niobium-titanium composite oxide $Li_2Na_{1.9}Ti_{5.8}Nb_{0.1}Sn_{0.1}O_{14}$ whose average primary particle size was 3 μm were used as first primary particles.

Primary particles of the orthorhombic Na-containing niobium-titanium composite oxide $Li_2Na_{1.9}Ti_{5.8}Nb_{0.1}Sn_{0.1}O_{14}$ were synthesized in the same manner as the synthesis of the first primary particles in Example 1 excluding the following points. First, a powder of tin oxide $SnO_2$ was further used as a raw material. Also, the titanium dioxide, the tin oxide, the lithium carbonate, the sodium carbonate, and the niobium (V) hydroxide as raw materials were mixed such that the molar ratio of Li:Na:Ti:Nb:Sn in the mixture is 2:1.9:5.8:0.1:0.1.

Example 17

In Example 17, an active material for a battery in Example 17 was produced in the same manner as in Example 3 except that primary particles of an orthorhombic Na-containing niobium-titanium composite oxide $Li_{2.1}Na_{1.9}Ti_{5.8}Nb_{0.1}Ta_{0.1}O_{14}$ whose average primary particle size was 3 μm were used as first primary particles.

Primary particles of the orthorhombic Na-containing niobium-titanium composite oxide $Li_{2.1}Na_{1.9}Ti_{5.8}Nb_{0.1}Ta_{0.1}O_{14}$ were synthesized in the same manner as the synthesis of the first primary particles in Example 1 excluding the following points. First, a powder of tantalum (V) oxide $Ta_2O_5$ was further used as a raw material. Also, the titanium dioxide, the tantalum (V) oxide, the lithium carbonate, the sodium carbonate, and the niobium (V) hydroxide as raw materials were mixed such that the molar ratio of Li:Na:Ti:Nb:Ta in the mixture is 2.1:1.9:5.8:0.1:0.1.

Example 18

In Example 18, an active material for a battery in Example 18 was produced in the same manner as in Example 3 except that primary particles of an orthorhombic Na-containing niobium-titanium composite oxide $Li_{2.1}Na_{1.9}Ti_{5.8}Nb_{0.1}V_{0.1}O_{14}$ whose average primary particle size was 3 μm were used as first primary particles.

Primary particles of the orthorhombic Na-containing niobium-titanium composite oxide $Li_{2.1}Na_{1.9}Ti_{5.8}Nb_{0.1}V_{0.1}O_{14}$ were synthesized in the same manner as the synthesis of the first primary particles in Example 1 excluding the following points. First, a powder of vanadium (V) oxide $V_2O_5$ was further used as a raw material. Also, the titanium dioxide, the vanadium (V) oxide, the lithium carbonate, the sodium carbonate, and niobium (V) hydroxide as raw materials were mixed such that the molar ratio of Li:Na:Ti:Nb:V in the mixture is 2.1:1.9:5.8:0.1:0.1.

Example 19

In Example 19, an active material for a battery in Example 19 was produced in the same manner as in Example 3 except that primary particles of an orthorhombic Na-containing niobium-titanium composite oxide $Li_2Na_{1.9}Ti_{5.8}Nb_{0.1}Fe_{0.1}O_{14}$ whose average primary particle size was 3 μm were used as first primary particles.

Primary particles of the orthorhombic Na-containing niobium-titanium composite oxide $Li_2Na_{1.9}Ti_{5.8}Nb_{0.1}Fe_{0.1}O_{14}$ were synthesized in the same manner as the synthesis of the first primary particles in Example 1 excluding the following points. First, a powder of iron (III) oxide $Fe_2O_3$ was further used as a raw material. Also, the titanium dioxide, the iron (III) oxide, the lithium carbonate, the sodium carbonate, and the niobium (V) hydroxide as raw materials were mixed such that the molar ratio of Li:Na:Ti:Nb:Fe in the mixture was 2:1.9:5.8:0.1:0.1.

Example 20

In Example 20, an active material for a battery in Example 20 was produced in the same manner as in Example 3 except that primary particles of an orthorhombic Na-containing niobium-titanium composite oxide $Li_2Na_{1.9}Ti_{5.8}Nb_{0.1}Co_{0.1}O_{14}$ whose average primary particle size was 3 μm were used as first primary particles.

Primary particles of the orthorhombic Na-containing niobium-titanium composite oxide $Li_2Na_{1.9}Ti_{5.8}Nb_{0.1}Co_{0.1}O_{14}$ were synthesized in the same manner as the synthesis of the first primary particles in Example 1 excluding the following points. First, a powder of cobalt oxide $Co_3O_4$ was further used as a material. Also, the titanium dioxide, the cobalt oxide, the lithium carbonate, the sodium carbonate, and the niobium hydroxide (V) as materials were mixed such that the molar ratio of Li:Na:Ti:Nb:Co in the mixture is 2:1.9:5.8:0.1:0.1.

Example 21

In Example 21, an active material for a battery in Example 21 was produced in the same manner as in Example 3 except that primary particles of an orthorhombic Na-containing niobium-titanium composite oxide $Li_2Na_{1.9}Ti_{5.8}Nb_{0.1}Mn_{0.1}O_{14}$ whose average primary particle size was 3 μm were used as first primary particles.

Primary particles of the orthorhombic Na-containing niobium-titanium composite oxide $Li_2Na_{1.9}Ti_{5.8}Nb_{0.1}Mn_{0.1}O_{14}$ were synthesized in the same manner as the synthesis of the first primary particles in Example 1 excluding the following points. First, a powder of manganese oxide $Mn_3O_4$ was further used as a raw material. Also, the titanium dioxide, the manganese oxide, the lithium carbonate, the sodium carbonate, and the niobium (V) hydroxide as raw materials were mixed such that the molar ratio of Li:Na:Ti:Nb:Mn in the mixture was 2:1.9:5.8:0.1:0.1.

Example 22

In Example 22, an active material for a battery in Example 22 was produced in the same manner as in Example 3 except that primary particles of an orthorhombic Na-containing niobium-titanium composite oxide $Li_2Na_{1.9}Ti_{5.8}Nb_{0.1}Mo_{0.1}O_{14}$ whose average primary particle size was 3 μm were used as first primary particles.

Primary particles of the orthorhombic Na-containing niobium-titanium composite oxide $Li_2Na_{1.9}Ti_{5.8}Nb_{0.1}Mo_{0.1}O_{14}$ were synthesized in the same manner as the synthesis of the first primary particles in Example 1 excluding the following points. First, a powder of molybdenum oxide $MoO_3$ was further used as a raw material. Also, the titanium dioxide, the molybdenum oxide, the lithium carbonate, the sodium carbonate, and the niobium (V) hydroxide as materials were mixed such that the molar ratio of Li:Na:Ti:Nb:Mo in the mixture was 2:1.9:5.8:0.1:0.1.

Example 23

In Example 23, an active material for a battery in Example 23 was produced in the same manner as in Example 3 except that primary particles of an orthorhombic Na-containing niobium-titanium composite oxide $Li_2Na_{1.7}Ti_{5.7}Nb_{0.3}O_{14}$ whose average primary particle size was 1 μm were used as first primary particles.

Primary particles of $Li_2Na_{1.7}Ti_{5.7}Nb_{0.3}O_{14}$ having the average primary particle size of 1 μm were synthesized in the same manner as the synthesis of the first primary particles in Example 1 except that the heat treatment of the mixture of the raw materials was performed at 850° C. for 3 hours.

Example 24

In Example 24, an active material for a battery in Example 24 was produced in the same manner as in Example 23 except that primary particles of rutile-type $TiO_2$ whose average primary particle size was 3 μm were used as second primary particles.

Example 25

In Example 25, an active material for a battery in Example 25 was produced in the same manner as in Example 3 except that primary particles of an orthorhombic Na-containing niobium-titanium composite oxide $Li_2Na_{1.7}Ti_{5.7}Nb_{0.3}O_{14}$ whose average primary particle size was 0.7 μm were used as first primary particles.

Primary particles of $Li_2Na_{1.7}Ti_{5.7}Nb_{0.3}O_{14}$ whose average primary particle size was 0.7 μm were synthesized in the same manner as the synthesis of the first primary particles in Example 1 except that the heat treatment of the mixture of the raw materials was performed at 850° C. for 1 hour.

Examples 26 to 28

In Examples 26 to 28, active materials for a battery in Examples 26 to 28 were produced in the same manner as in Example 3 except that the concentration of carboxymethyl cellulose of a carboxymethyl cellulose solution into which the first primary particles and the second primary particles were input was changed.

In Example 26, carboxymethyl cellulose was added by 1% by mass with respect to the total mass $W_A+W_B$ of the first primary particles and the second primary particles. The average secondary particle size of the obtained active material for a battery was 20 μm.

In Example 27, carboxymethyl cellulose was added by 1.2% by mass with respect to the total mass $W_A+W_B$ of the first primary particles and the second primary particles. The average secondary particle size of the obtained active material for a battery was 25 μm.

In Example 28, carboxymethyl cellulose was added by 1.5% by mass with respect to the total mass $W_A+W_B$ of the first primary particles and the second primary particles. The average secondary particle size of the obtained active material for a battery was 30 μm.

Examples 29 to 31

In Examples 29 to 31, active materials for a battery in Examples 29 to 31 were produced in the same manner as in Example 25 except that the concentration of carboxymethyl cellulose of a carboxymethyl cellulose solution into which the first primary particles and the second primary particles were input was changed.

In Example 29, carboxymethyl cellulose was added by 0.3% by mass with respect to the total mass $W_A+W_B$ of first primary particles and second primary particles. The average secondary particle size of the obtained active material for a battery was 5 μm.

In Example 30, carboxymethyl cellulose was added by 0.5% by mass with respect to the total mass $W_A+W_B$ of the first primary particles and the second primary particles. The average secondary particle size of the obtained active material for a battery was 8 μm.

In Example 31, carboxymethyl cellulose was added by 0.8% by mass with respect to the total mass $W_A+W_B$ of the first primary particles and the second primary particles. The average secondary particle size of the obtained active material for a battery was 10 μm.

Examples 32 to 34

In Examples 32 to 34, active materials for a battery in Examples 32 to 34 were produced in the same manner as in Example 3 except that in the preparation of slurry to produce secondary particles, the ratio of the mass $W_A$ of the first primary particle and the mass $W_B$ of the second primary particle was changed to 9:1 (81% bymass:9% by mass), 7:3 (63% bymass:27% by mass), and 1:1 (45% by mass: 45% by mass) respectively.

Comparative Example 1

In Comparative Example 1, an active material for a battery was produced in the same manner as in Example 1 except that second primary particles were not used in the preparation of slurry to produce secondary particles.

In Comparative Example 1, in the preparation of slurry to produce secondary particles, the concentration of carboxymethyl cellulose in the slurry with respect to the mass $W_A$ of the first primary particle was set to 0.8% by mass.

Comparative Example 2

In Comparative Example 2, primary particles of an orthorhombic Na-containing niobium-titanium composite oxide $Li_2Na_{1.7}Ti_{5.7}Nb_{0.3}O_{14}$ synthesized in the same manner as in Example 1 were used as an active material for a battery in Comparative Example 2.

Comparative Example 3

In Comparative Example 3, primary particles of an orthorhombic Na-containing niobium-titanium composite oxide $Li_2Na_{1.7}Ti_{5.7}Nb_{0.3}O_{14}$ synthesized in the same manner as in Example 23 were used as an active material for a battery in Comparative Example 3.

[Production of Electrode]

Electrodes in Examples 2 to 34 and Comparative Examples 1 to 3 were produced according to the same procedure as that in Example 1 except that active materials for a battery in Examples 2 to 34 and Comparative Examples 1 to 3 were used.

Example 1-A

In Example 1-A, an electrode in Example 1-A was produced according to the following procedure.

First, an active material for a battery produced in the same manner as in Example 1, an acetylene black as a conductive agent, and a polyvinylidene difluoride (PVdF) as a binder were provided. Next, the active material for a battery, the acetylene black, and the PVdF were added in the mixing ratio of 90% bymass:5% bymass:5% by mass to N-methylpyrrolidone (NMP) as a solvent and mixed. The mixture thus obtained was further dispersed using a planetary centrifugal mixer to prepare a slurry. The prepared slurry was further dispersed by a bead mill device using zirconia beads under the conditions of 3000 rpm and the flow rate of 50 ml/min. In this manner, a slurry for producing an electrode was obtained.

The slurry for producing an electrode was applied to both surfaces of a current collector made of aluminum foil whose thickness is 15 μm to obtain a coated film. The obtained coated film was subjected to drying and pressing. In this manner, an electrode in Example 1-A whose electrode density (excluding the current collector) is 2.3 g/cm³ was obtained.

As a result of observing the produced electrode in Example 1-A through SEM, disintegration of secondary particles was confirmed.

Example 1-B

In Example 1-B, an electrode in Example 1-B was produced according to the following procedure.

First, an active material for a battery produced in the same manner as in Example 1, an acetylene black as a conductive agent, and a polyvinylidene difluoride (PVdF) as a binder were provided. Next, the active material for a battery, the acetylene black, and the PVdF were added in the mixing ratio of 90% bymass:5% bymass:5% by mass to N-methylpyrrolidone (NMP) as a solvent and mixed. The mixture thus obtained was further dispersed using a planetary centrifugal mixer to prepare a slurry. The prepared slurry was applied to both surfaces of a current collector made of aluminum foil whose thickness was 15 μm to obtain a coated film. The coated film was subjected to drying and pressing. In this manner, an electrode in Example 1-B whose electrode density (excluding the current collector) was 3.0 g/cm³ was obtained.

As a result of observing the produced electrode in Example 1-B through SEM, disintegration of secondary particles was confirmed.

<Test>

Electrodes in Examples 1 to 34, Comparative Examples 1 to 3, and Examples 1-A and 1-B were tested according to the following procedures. The procedures for testing the electrode in Example 1 will be described below, but similar tests were performed for other Examples and Comparative Examples.

[Production of Cells for Electrode Evaluation]

Cell for electrode evaluation was produced in dry argon. The electrode in Example 1 produced as described above was used as a working electrode and Li metal was used as a counter electrode. These electrodes were placed opposite to each other via a glass filter (separator) and a reference electrode made of lithium metal was inserted without contact with the working electrode and with the counter electrode.

The above members were put into a 3-pole glass cell, each of terminals of the glass cell was connected to each of the working electrode, the counter electrode, and the reference electrode, a nonaqueous electrolyte was poured, and a glass container was sealed in a state where the separator and the electrodes were sufficiently impregnated with the electrolyte solution. In this manner, cell for electrode evaluation in Example 1 was produced.

A mixed solvent obtained by mixing ethylene carbonate (EC) and diethyl carbonate (DEC) in the volume ratio 1:2 was used as the solvent of the nonaqueous electrolyte. $LiPF_6$ was used as the electrolyte. The nonaqueous electrolyte was prepared by dissolving $LiPF_6$ in the mixed solvent in the concentration of 1.0 mol/L.

[Charge-and-Discharge Test of Cells for Electrode Evaluation]

Using the produced cell in Example 1, a discharge rate test and a charge rate test were performed in the environment of 25° C. In the discharge rate test, a 0.2 C discharge capacity and a 3 C discharge capacity were measured and the ratio of the 3 C discharge capacity to the 0.2 C discharge capacity was set as a 3 C/0.2 C capacity ratio (%). Charging was performed at 1 C in all cases. Here, the 1 C represents the value of current that charges and discharges the capacity 120 mAh/g per unit mass of the active material in 1 hour. Charging was performed in a constant current-and-constant voltage mode. More specifically, charging was first performed at constant current of 1 C until the voltage reaches 1.0 V vs. $Li/Li^+$, next charging at constant current was switched to charging at constant voltage, where charging was terminated when the current value reaches 0.05 C. Discharging was performed in constant current mode and the discharge final voltage was set to 1.5 V vs. $Li/Li^+$.

Also in the charge rate test, a 0.2 C charge capacity and a 3 C charge capacity were measured and the ratio of the 3 C charge capacity to the 0.2 C charge capacity was set as a 3 C/0.2 C capacity ratio (%). Discharging was performed at 1 C in all cases. Discharging was performed in constant current-and-constant voltage mode. More specifically, discharging was performed at constant current of 1 C until the voltage reaches 1.5 V vs. $Li/Li^+$, next discharging at constant current was switched to discharging at constant voltage, where discharging was terminated when the current value reaches 0.05 C. Charging was performed in constant current mode and the charge final voltage was set to 1.0 V vs. $Li/Li^+$.

In Tables 1 and 2 below, the composition and the average primary particle size $D_A$ of the first primary particles included in each of the active materials for a battery in Examples 1 to 34, Comparative Example 1 to 3, and Example 1-A and 1-B, the composition and the average primary particle size $D_B$ of the second primary particles included in each of the active materials for a battery in the Examples and the Comparative Example, and the ratio of the mass $W_A$ of the first primary particle and the mass $W_B$ of the second primary particle included in each of active materials for a battery in the Examples and the Comparative Examples are shown. Also in Table 3 below, the average secondary particle size $D_C$ of the secondary particles contained in each of the active materials for a battery in Examples 1 to 34, Comparative Examples 1 to 3, and Examples 1-A and 1-B, and the results of the charge-and-discharge tests of the cells for electrode evaluation in Examples 1 to 34, Comparative Examples 1 to 3, and Examples 1-A and 1-B are shown. Incidentally, as described above, secondary particles of active materials for a battery included in electrodes in Examples 1-A and 1-B were disintegrated. Thus, in the fields of the average secondary particle size $D_C$ of Examples 1-A and 1-B in Table 3, the average secondary particle size $D_C$ of the active materials for a battery used to produce these electrodes was parenthesized.

TABLE 1

| | First Primary Particles ① | | Second Primary Particles ② | | Mass Ratio of ①:② $W_A:W_B$ [mass %:mass %] |
|---|---|---|---|---|---|
| | Composition | Average Primary Particle Size $D_A$ | Composition | Average Primary Particle Size $D_B$ | |
| Example 1 | $Li_2Na_{1.7}Ti_{5.7}Nb_{0.3}O_{14}$ | 3 μm | $Li_4Ti_5O_{12}$ | 1 μm | 72:18 |
| Example 2 | $Li_2Na_{1.7}Ti_{5.7}Nb_{0.3}O_{14}$ | 3 μm | Anatase-type $TiO_2$ | 1 μm | 72:18 |
| Example 3 | $Li_2Na_{1.7}Ti_{5.7}Nb_{0.3}O_{14}$ | 3 μm | Rutile-type $TiO_2$ | 1 μm | 72:18 |
| Example 4 | $Li_2Na_{1.7}Ti_{5.7}Nb_{0.3}O_{14}$ | 3 μm | Carbon Black | 0.5 μm | 72:18 |
| Example 5 | $Li_2Na_{1.7}Ti_{5.7}Nb_{0.3}O_{14}$ | 3 μm | Graphite | 1 μm | 72:18 |
| Example 6 | $Li_2Na_{1.7}Ti_{5.7}Nb_{0.3}O_{14}$ | 3 μm | TiN | 1 μm | 72:18 |
| Example 7 | $Li_2Na_{1.7}Ti_{5.7}Nb_{0.3}O_{14}$ | 3 μm | TiC | 1 μm | 72:18 |
| Example 8 | $Li_2Na_{1.9}Ti_{5.9}Nb_{0.1}O_{14}$ | 3 μm | Rutile-type $TiO_2$ | 1 μm | 72:18 |
| Example 9 | $Li_2Na_{1.5}Ti_{5.5}Nb_{0.5}O_{14}$ | 3 μm | Rutile-type $TiO_2$ | 1 μm | 72:18 |
| Example 10 | $Li_2NaTi_5NbO_{14}$ | 3 μm | Rutile-type $TiO_2$ | 1 μm | 72:18 |
| Example 11 | $Li_2Na_{1.5}Sr_{0.2}Ti_{5.9}Nb_{0.1}O_{14}$ | 3 μm | Rutile-type $TiO_2$ | 1 μm | 72:18 |
| Example 12 | $Li_2Na_{1.5}Ba_{0.2}Ti_{5.9}Nb_{0.1}O_{14}$ | 3 μm | Rutile-type $TiO_2$ | 1 μm | 72:18 |
| Example 13 | $Li_2Na_{1.5}Ba_{0.2}Ti_{5.5}Nb_{0.5}O_{14}$ | 3 μm | Rutile-type $TiO_2$ | 1 μm | 72:18 |
| Example 14 | $Li_{2.3}Na_{1.9}Ti_{5.8}Nb_{0.1}Al_{0.3}O_{14}$ | 3 μm | Rutile-type $TiO_2$ | 1 μm | 72:18 |
| Example 15 | $Li_2Na_{1.9}Ti_{5.8}Nb_{0.1}Zr_{0.1}O_{14}$ | 3 μm | Rutile-type $TiO_2$ | 1 μm | 72:18 |
| Example 16 | $Li_2Na_{1.9}Ti_{5.8}Nb_{0.1}Sn_{0.1}O_{14}$ | 3 μm | Rutile-type $TiO_2$ | 1 μm | 72:18 |
| Example 17 | $Li_{2.1}Na_{1.9}Ti_{5.8}Nb_{0.1}Ta_{0.1}O_{14}$ | 3 μm | Rutile-type $TiO_2$ | 1 μm | 72:18 |
| Example 18 | $Li_{2.1}Na_{1.9}Ti_{5.8}Nb_{0.1}V_{0.1}O_{14}$ | 3 μm | Rutile-type $TiO_2$ | 1 μm | 72:18 |
| Example 19 | $Li_2Na_{1.9}Ti_{5.8}Nb_{0.1}Fe_{0.1}O_{14}$ | 3 μm | Rutile-type $TiO_2$ | 1 μm | 72:18 |
| Example 20 | $Li_2Na_{1.9}Ti_{5.8}Nb_{0.1}Co_{0.1}O_{14}$ | 3 μm | Rutile-type $TiO_2$ | 1 μm | 72:18 |
| Example 21 | $Li_2Na_{1.9}Ti_{5.8}Nb_{0.1}Mn_{0.1}O_{14}$ | 3 μm | Rutile-type $TiO_2$ | 1 μm | 72:18 |
| Example 22 | $Li_2Na_{1.9}Ti_{5.8}Nb_{0.1}Mo_{0.1}O_{14}$ | 3 μm | Rutile-type $TiO_2$ | 1 μm | 72:18 |

TABLE 1-continued

| | First Primary Particles ① | | Second Primary Particles ② | | Mass Ratio of ①:② $W_A:W_B$ [mass %:mass %] |
|---|---|---|---|---|---|
| | Composition | Average Primary Particle Size $D_A$ | Composition | Average Primary Particle Size $D_B$ | |
| Example 23 | $Li_2Na_{1.7}Ti_{5.7}Nb_{0.3}O_{14}$ | 1 μm | Rutile-type $TiO_2$ | 1 μm | 72:18 |
| Example 24 | $Li_2Na_{1.7}Ti_{5.7}Nb_{0.3}O_{14}$ | 1 μm | Rutile-type $TiO_2$ | 3 μm | 72:18 |
| Example 25 | $Li_2Na_{1.7}Ti_{5.7}Nb_{0.3}O_{14}$ | 0.7 μm | Rutile-type $TiO_2$ | 1 μm | 72:18 |
| Example 26 | $Li_2Na_{1.7}Ti_{5.7}Nb_{0.3}O_{14}$ | 3 μm | Rutile-type $TiO_2$ | 1 μm | 72:18 |
| Example 27 | $Li_2Na_{1.7}Ti_{5.7}Nb_{0.3}O_{14}$ | 3 μm | Rutile-type $TiO_2$ | 1 μm | 72:18 |
| Example 28 | $Li_2Na_{1.7}Ti_{5.7}Nb_{0.3}O_{14}$ | 3 μm | Rutile-type $TiO_2$ | 1 μm | 72:18 |
| Example 29 | $Li_2Na_{1.7}Ti_{5.7}Nb_{0.3}O_{14}$ | 0.7 μm | Rutile-type $TiO_2$ | 1 μm | 72:18 |
| Example 30 | $Li_2Na_{1.7}Ti_{5.7}Nb_{0.3}O_{14}$ | 0.7 μm | Rutile-type $TiO_2$ | 1 μm | 72:18 |
| Example 31 | $Li_2Na_{1.7}Ti_{5.7}Nb_{0.3}O_{14}$ | 0.7 μm | Rutile-type $TiO_2$ | 1 μm | 72:18 |
| Example 32 | $Li_2Na_{1.7}Ti_{5.7}Nb_{0.3}O_{14}$ | 3 μm | Rutile-type $TiO_2$ | 1 μm | 81:9 |
| Example 33 | $Li_2Na_{1.7}Ti_{5.7}Nb_{0.3}O_{14}$ | 3 μm | Rutile-type $TiO_2$ | 1 μm | 63:27 |
| Example 34 | $Li_2Na_{1.7}Ti_{5.7}Nb_{0.3}O_{14}$ | 3 μm | Rutile-type $TiO_2$ | 1 μm | 45:45 |

TABLE 2

| | First Primary Particles ① | | Second Primary Particles ② | | Mass Ratio of ①:② $W_A:W_B$ [mass %:mass %] |
|---|---|---|---|---|---|
| | Composition | Average Primary Particle Size $D_A$ | Composition | Average Primary Particle Size $D_B$ (μm) | |
| Comparative Example 1 | $Li_2Na_{1.7}Ti_{5.7}Nb_{0.3}O_{14}$ | 3 μm | — | — | — |
| Comparative Example 2 | $Li_2Na_{1.7}Ti_{5.7}Nb_{0.3}O_{14}$ | 3 μm | — | — | — |
| Comparative Example 3 | $Li_2Na_{1.7}Ti_{5.7}Nb_{0.3}O_{14}$ | 1 μm | — | — | — |
| Example A-1 | $Li_2Na_{1.7}Ti_{5.7}Nb_{0.3}O_{14}$ | 3 μm | Rutile-type $TiO_2$ | 1 μm | 72:18 |
| Example A-2 | $Li_2Na_{1.7}Ti_{5.7}Nb_{0.3}O_{14}$ | 3 μm | Rutile-type $TiO_2$ | 1 μm | 72:18 |

TABLE 3

| | Secondary Particle Size $D_C$ | 3 C/0.2 C Charge Capacity Ratio (%) | 3 C/0.2 C Discharge Capacity Ratio (%) |
|---|---|---|---|
| Example 1 | 15 μm | 72 | 78 |
| Example 2 | 15 μm | 69 | 76 |
| Example 3 | 15 μm | 74 | 78 |
| Example 4 | 15 μm | 76 | 75 |
| Example 5 | 15 μm | 68 | 75 |
| Example 6 | 15 μm | 66 | 73 |
| Example 7 | 15 μm | 66 | 72 |
| Example 8 | 15 μm | 68 | 76 |
| Example 9 | 15 μm | 76 | 78 |
| Example 10 | 15 μm | 70 | 75 |
| Example 11 | 15 μm | 77 | 77 |
| Example 12 | 15 μm | 73 | 74 |
| Example 13 | 15 μm | 75 | 76 |
| Example 14 | 15 μm | 69 | 73 |
| Example 15 | 15 μm | 68 | 72 |
| Example 16 | 15 μm | 70 | 70 |
| Example 17 | 15 μm | 67 | 70 |
| Example 18 | 15 μm | 72 | 74 |
| Example 19 | 15 μm | 67 | 71 |
| Example 20 | 15 μm | 70 | 73 |
| Example 21 | 15 μm | 70 | 71 |
| Example 22 | 15 μm | 68 | 71 |
| Example 23 | 15 μm | 78 | 78 |
| Example 24 | 15 μm | 77 | 77 |
| Example 25 | 15 μm | 79 | 79 |
| Example 26 | 20 μm | 72 | 75 |
| Example 27 | 25 μm | 69 | 73 |
| Example 28 | 30 μm | 67 | 69 |
| Example 29 | 5 μm | 82 | 80 |
| Example 30 | 8 μm | 81 | 78 |
| Example 31 | 10 μm | 80 | 78 |
| Example 32 | 15 μm | 70 | 74 |
| Example 33 | 15 μm | 77 | 80 |
| Example 34 | 15 μm | 79 | 80 |
| Comparative Example 1 | 15 μm | 57 | 65 |
| Comparative Example 2 | — | 51 | 62 |
| Comparative Example 3 | — | 53 | 64 |
| Example 1-A | (15 μm) | 60 | 66 |
| Example 1-B | (15 μm) | 62 | 66 |

From results shown in Tables 1 to 3, it is clear that electrodes in Examples 1 to 34 and Examples 1-A and 1-B produced using the active materials for a battery in Examples 1 to 34 were superior in input-and-output performances to the electrodes in Comparative Examples 1 to 3 produced using active materials for a battery in Comparative Examples 1 to 3.

Comparison of results of Examples 1 to 7 shows that Examples 1 and 3 using rutile-type $TiO_2$ or lithium titanate $Li_4Ti_5O_{12}$ as second primary particles exhibited particularly preferable input-and-output performances. It is considered that these second primary particles of titanium-containing oxide had high contact properties with first primary particles of the orthorhombic Na-containing niobium-titanium composite oxide $Li_2Na_{1.7}Ti_{5.7}Nb_{0.3}O_{14}$ inside secondary particles.

From comparison of results of Example 3 and Examples 8 to 22, it is clear that good input-and-output performances are similarly obtained from the secondary particles containing first primary particles of the orthorhombic Na-containing niobium-titanium composite oxides including different elements.

From comparison of results of Example 3 and Examples 23 to 25, it is clear that good input-and-output performance are similarly obtained from secondary particles in which the average primary particle size ratio between first primary particles of the orthorhombic Na-containing niobium-titanium composite oxide and the second primary particles of is different.

From comparison of results of Example 3 and Examples 26 to 31, it is clear that more excellent input-and-output performances can be achieved with a decreasing the average secondary particle size $D_C$ of secondary particles. Further, it is found that making the average primary particle size $D_A$ of the first primary particles of the orthorhombic Na-containing niobium-titanium composite oxide smaller is effective for input performance.

From comparison of results of Example 3 and Examples 32 to 34, it is clear that more excellent input-and-output performances were obtained with an increasing content of the second primary particles included in the secondary particles. However, if the content of second primary particles is increased, the energy density is decreased and thus, it is preferable to produce secondary particles in consideration of the desired energy density.

From comparison of results of Example 1 and Comparative Examples 1 to 3, it is clear that electrodes in Comparative Examples 1 to 3 produced by forming only the first primary particles of the orthorhombic Na-containing niobium-titanium composite oxide into secondary particles or using the first primary particles in a state of primary particles are inferior in input-and-output performances to electrodes produced by using active materials for a battery including secondary particles including, like Examples 1 to 34, both of the first primary particles of the orthorhombic Na-containing niobium-titanium composite oxide and the second primary particles.

In each of the electrodes in Example 1-A and 1-B, an active material for a battery similar to that in Example 1 is used. However, in the Example 1-A and 1-B, the bead mill process or the excessive electrode pressing process was performed to make the secondary particles disintegrated. It is considered that because secondary particles were disintegrated, the electrodes in Examples 1-A and 1-B were inferior in input-and-output performances to the electrodes in Examples 1 to 34. From these results, maintaining the form of secondary particles in each process of electrode production is considered to be important.

Example 35

In Example 35, a nonaqueous electrolyte battery in Example 35 was produced according to the following procedures.

[Production of Positive Electrode]

First, $LiNi_{0.33}Co_{0.33}Mn_{0.33}O_2$ as a positive electrode active material, an acetylene black as a conductive agent, and a polyvinylidene difluoride (PVdF) as a binder were provided. Next, the $LiNi_{0.33}Co_{0.33}Mn_{0.33}O_2$, the acetylene black, and the PVdF were added in the mixing ratio of 90% bymass:5% bymass:5% by mass to N-methylpyrrolidone (NMP) as a solvent and mixed. The mixture thus obtained was further dispersed using a planetary centrifugal mixer to prepare a slurry. The slurry was applied to both surfaces of a current collector made of aluminum foil whose thickness is 15 μm to obtain a coated film. The coated film was subjected to drying and pressing to produce a positive electrode whose electrode density (excluding the current collector) was 3.2 g/cm$^3$.

[Production of Negative Electrode]

A negative electrode was produced according to the same procedure as that for producing an electrode in Example 3.

[Production of Electrode Group]

First, two separators made of a porous film made of polyethylene whose thickness is 25 μm were provided.

Next, the positive electrode produced as described above, one separator, the negative electrode produced as described above, and the other separator were stacked in this order to obtain a laminate. The laminate was wound spirally. Next, this was heat-presseded at 90° C. In this manner, a flat electrode group having a width of 30 mm and a thickness of 3.0 mm was produced.

The obtained electrode group was housed in a pack made of a laminate film for vacuum drying at 80° C. for 24 hours. The laminate film is constituted by forming a propylene layer on both surfaces of aluminum foil having a thickness of 40 μm, and the overall thickness was 0.1 mm.

[Preparation of Liquid Nonaqueous Electrolyte]

A mixed solvent was prepared by mixing propylene carbonate (PC) and diethyl carbonate (DEC) in the volume ratio of 1:1. $LiPF_6$ was dissolved at 1 M in the mixed solvent to prepare a liquid nonaqueous electrolyte.

[Manufacturing of Nonaqueous Electrolyte Secondary Battery]

The liquid nonaqueous electrolyte was poured into the laminate film pack housing the electrode group. Then, the pack was completely sealed by heat sealing. In this manner, a nonaqueous electrolyte battery in Example 35 having the same structure as that shown in FIGS. 3 and 4, a width of 35 mm, a thickness of 3.2 mm, and a height of 65 mm was obtained.

Example 36

In Example 36, a nonaqueous electrolyte battery in Example 36 was produced according to the same procedures as that in Example 35 except that instead of $LiNi_{0.33}Co_{0.33}Mn_{0.33}O_2$, $LiCoO_2$ was used as the positive electrode active material.

Example 37

In Example 37, a nonaqueous electrolyte battery in Example 37 was produced according to the same procedures as that in Example 35 except that instead of $LiNi_{0.33}Co_{0.33}Mn_{0.33}O_2$, $LiNi_{0.5}Co_{0.2}Mn_{0.3}O_2$ was used as the positive electrode active material.

Example 38

In Example 38, a nonaqueous electrolyte battery in Example 38 was produced according to the same procedures as that in Example 35 except that instead of $LiNi_{0.33}Co_{0.33}Mn_{0.33}O_2$, $LiNi_{0.6}Co_{0.2}Mn_{0.2}O_2$ was used as the positive electrode active material.

Example 39

In Example 39, a nonaqueous electrolyte battery in Example 39 was produced according to the same procedures as that in Example 35 except that instead of $LiNi_{0.33}Co_{0.33}Mn_{0.33}O_2$, $LiNi_{0.8}Co_{0.1}Mn_{0.1}O_2$ was used as the positive electrode active material.

Example 40

In Example 40, a nonaqueous electrolyte battery in Example 40 was produced according to the same procedures as that in Example 35 except that instead of $LiNi_{0.33}Co_{0.33}Mn_{0.33}O_2$, $LiAl_{0.15}Mn_{1.85}O_4$ was used as the positive electrode active material.

Example 41

In Example 41, a nonaqueous electrolyte battery in Example 41 was produced according to the same procedures as that in Example 35 except that instead of $LiNi_{0.33}Co_{0.33}Mn_{0.33}O_2$, $LiMn_{0.85}Fe_{0.1}Mg_{0.05}PO_4$ was used as the positive electrode active material.

Example 42

In Example 42, a nonaqueous electrolyte battery in Example 42 was produced according to the same procedures as that in Example 35 except that instead of $LiNi_{0.33}Co_{0.33}Mn_{0.33}O_2$, a mixture of $LiNi_{0.33}Co_{0.33}Mn_{0.33}O_2$ 72% by mass and $LiCoO_2$ 18% by mass was used as the positive electrode active material.

Example 43

In Example 43, a nonaqueous electrolyte battery in Example 43 was produced according to the same procedures as that in Example 35 except that instead of $LiNi_{0.33}Co_{0.33}Mn_{0.33}O_2$, a mixture of $LiNi_{0.33}CO_{0.33}Mn_{0.33}O_2$ 45% by mass and $LiCoO_2$ 45% by mass was used as the positive electrode active material.

Example 44

In Example 44, a nonaqueous electrolyte battery in Example 44 was produced according to the same procedures as that in Example 35 except that instead of $LiNi_{0.33}CO_{0.33}Mn_{0.33}O_2$, a mixture of $LiNi_{0.33}Co_{0.33}Mn_{0.33}O_2$ 45% by mass and $LiAl_{0.15}Mn_{1.85}O_4$ 45% by mass was used as the positive electrode active material.

Example 45

In Example 45, a nonaqueous electrolyte battery in Example 45 was produced according to the same procedures as that in Example 35 except that instead of $LiNi_{0.33}Co_{0.33}Mn_{0.33}O_2$, a mixture of $LiNi_{0.33}Co_{0.33}Mn_{0.33}O_2$ 45% by mass and $LiMn_{0.85}Fe_{0.1}Mg_{0.05}PO_4$ 45% by mass was used as the positive electrode active material.

Comparative Examples 4 to 6

In each of Comparative Examples 4 to 6, each of nonaqueous electrolyte batteries in Comparative Examples 4 to 6 was produced according to the same procedures as that in Example 35 except that each of the electrodes produced in the same manner as electrodes in Comparative Examples 1 to 3 as negative electrodes were used.

[Input-and-Output Test]

The following test was performed for each of nonaqueous electrolyte batteries in Examples 35 to 45 and Comparative Examples 4 to 6.

First, the battery to be measured was adjusted to SOC 50%. Next, the battery was charged at 25° C. at constant current of 10 C for 10 seconds. The input density [kW/kg] per unit mass of the nonaqueous electrolyte battery was measured during the charge.

Next, the battery to be measured was adjusted to SOC 50%. Next, the battery was discharged at 25° C. at constant current of 10 C for 10 seconds. The output density [kW/kg] per unit mass of the nonaqueous electrolyte battery was measured during the discharge.

The positive electrode active material and the results of the input-and-output test for nonaqueous electrolyte batteries in Examples 35 to 45 and Comparative Examples 4 to 6 were shown in Table 4 below.

TABLE 4

| | Negative Electrode | Positive Electrode Active Material | Input Density (kW/kg) | Output Densitiy (kW/kg) |
|---|---|---|---|---|
| Example 35 | Example 3 | $LiNi_{0.33}Co_{0.33}Mn_{0.33}O_2$ | 2.8 | 2.8 |
| Example 36 | Example 3 | $LiCoO_2$ | 3.0 | 3.1 |
| Example 37 | Example 3 | $LiNi_{0.5}Co_{0.2}Mn_{0.3}O_2$ | 2.7 | 2.7 |
| Example 38 | Example 3 | $LiNi_{0.6}Co_{0.2}Mn_{0.2}O_2$ | 2.7 | 2.7 |
| Example 39 | Example 3 | $LiNi_{0.8}Co_{0.1}Mn_{0.1}O_2$ | 2.6 | 2.7 |
| Example 40 | Example 3 | $LiAl_{0.15}Mn_{1.85}O_4$ | 3.0 | 3.2 |
| Example 41 | Example 3 | $LiMn_{0.85}Fe_{0.1}Mg_{0.05}PO_4$ | 2.5 | 2.7 |
| Example 42 | Example 3 | NCM111 72%-LCO 18% | 2.9 | 2.9 |
| Example 43 | Example 3 | NCM111 45%-LCO 45% | 2.9 | 3.0 |
| Example 44 | Example 3 | NCM111 45%-LAMO 45% | 2.9 | 3.1 |
| Example 45 | Example 3 | NCM111 45%-LMFP 45% | 2.6 | 2.8 |
| Comparative Example 4 | Comparative Example 1 | $LiNi_{0.33}Co_{0.33}Mn_{0.33}O_2$ | 2.3 | 2.4 |
| Comparative Example 5 | Comparative Example 2 | $LiNi_{0.33}Co_{0.33}Mn_{0.33}O_2$ | 2.0 | 2.2 |
| Comparative Example 6 | Comparative Example 3 | $LiNi_{0.33}Co_{0.33}Mn_{0.33}O_2$ | 2.2 | 2.3 |

From comparison of results in Examples 35 to 45 and Comparative Examples 4 to 6 shown in Table 4, it is found that nonaqueous electrolyte batteries in Examples 35 to 45 can exhibit input-and-output performances superior to those in Comparative Examples 4 to 6. From this result, it is clear that electrodes in Examples can realize a nonaqueous electrolyte battery capable of exhibiting excellent input-and-output performances by combining various positive electrodes. It can be considered that this result was obtained because the improvement in the input-and-output performances of the negative electrode led to the improvement in the input-and-output performances of the battery.

According to one or more embodiments and examples described above, an active material for a battery is provided. The active material for a battery includes secondary particles. The secondary particles include first primary particles and second primary particles. The first primary particles include an orthorhombic Na-containing niobium-titanium composite oxide. Second primary particles include at least one selected from the group consisting of a carbon black, a graphite, a titanium nitride, a titanium carbide, a lithium titanate having a spinel structure, a titanium dioxide having an anatase structure, and a titanium dioxide having a rutile structure. Second primary particles can exhibit a high conductivity and increase a conductivity of secondary particles including the first primary particles. Therefore, the active material for a battery can provide a nonaqueous electrolyte battery capable of exhibiting a excellent input-and-output performances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising secondary particles which are aggregates of first primary particles and second primary particles: the first primary particles comprising orthorhombic Na-containing niobium-titanium composite oxide particles; and the second primary particles comprising at least one kind of particles selected from the group consisting of carbon black particles, graphite particles, titanium nitride particles, titanium carbide particles, particles of lithium titanate having a spinel structure, particles of titanium dioxide having an anatase structure, and particles of titanium dioxide having a rutile structure, wherein the orthorhombic Na-containing niobium-titanium composite oxide is represented by a general formula of $Li_{2+v}Na_{2-w}M1_xTi_{6-y-z}Nb_yM2_zO_{14+\delta}$ and in the general formula, M1 is at least one metallic element selected from the group consisting of Cs, K, Sr, Ba, and Ca, M2 is at least one metallic element selected from the group consisting of Zr, Sn, V, Ta, Mo, W, Fe, Co, Mn, and Al, and $0 \leq v \leq 4$, $0 < w < 0.5$, $0 \leq x < 2$, $0 < y \leq 6$, $0 \leq z < 3$, $-0.5 \leq \delta \leq 0.5$, the secondary particles comprise a binder, and the binder comprises at least one selected from the group consisting of polyvinyl alcohol, carboxymethyl cellulose, and sugars.

2. The active material according to claim 1, wherein the second primary particles include at least one kind of particles selected from the group consisting of the particles of the lithium titanate having the spinel structure, the particles of the titanium dioxide having the anatase structure, and the particles of the titanium dioxide having the rutile structure.

3. The active material according to claim 1, which is used for a battery.

4. A nonaqueous electrolyte battery comprising:
a negative electrode comprising the active material according to claim 1;
a positive electrode; and
a nonaqueous electrolyte.

5. The nonaqueous electrolyte battery according to claim 4, wherein the positive electrode comprises at least one selected from the group consisting of a lithium cobalt composite oxide, a lithium-nickel-cobalt-manganese composite oxide, a lithium-manganese composite oxide having a spinel structure, and a lithium-iron-manganese composite phosphate compound having an olivine structure.

6. A battery pack comprising the nonaqueous electrolyte battery according to claim 4.

7. The battery pack according to claim 6, further comprising:
an external power distribution terminal; and
a protective circuit.

8. A battery pack comprising nonaqueous electrolyte batteries, each of the nonaqueous electrolyte batteries comprising:
a negative electrode comprising the active material according to claim 1;
a positive electrode; and
a nonaqueous electrolyte;
wherein the nonaqueous electrolyte batteries are connected in series, in parallel or with a combination of series connection and parallel connection.

9. A vehicle comprising the battery pack according to claim 6.

10. The vehicle according to claim 9, wherein the battery pack is configured to recover a regenerative energy caused by a power of the vehicle.

11. The active material according to claim 1, wherein a mass ratio $W_A/W_B$ of a mass $W_A$ of the first primary particles to a mass $W_B$ of the second primary particles is within a range of $4 \leq W_A/W_B \leq 20$.

12. The active material according to claim 1, wherein an average particle size $D_A$ of the first primary particles is equal to or larger than an average particle size $D_B$ of the second primary particles.

13. The active material according to claim 12, wherein a ratio of $D_A/D_B$ is within a range of from 2.5 to 10.

14. The active material according to claim 12, wherein the average particle size $D_A$ is within a range of 500 nm to 5 μm, and the average particle size $D_B$ is within a range of 200 nm to 5 μm.

15. The active material according to claim 1, wherein the binder is positioned between the secondary particles.

16. The active material according to claim 1, wherein the binder is positioned between the first primary particles and the second primary particles.

17. The active material according to claim 1, wherein the secondary particles comprise the binder in an amount of 0.2% by mass to 3% by mass with respect to a total mass of the first primary particles and the second primary particles.

18. The active material according to claim 1, wherein the subscript y is within a range from 0.1 to 1.

19. The active material according to claim 1, wherein the subscript z is within a range from 0 to 0.3.

20. The active material according to claim 1, wherein the secondary particles have an average particle size $D_C$ within the range of 5 μm to 25 μm,
an average particle size $D_A$ of the first primary particles is within a range of 500 nm to 5 μm, and
an average particle size $D_B$ of the second primary particles is within a range of 200 nm to 5 μm.

* * * * *